United States Patent
Sun et al.

(10) Patent No.: US 11,476,993 B2
(45) Date of Patent: Oct. 18, 2022

(54) METHOD FOR TRANSMITTING DEMODULATION REFERENCE SIGNAL AND NETWORK DEVICE

(71) Applicant: VIVO MOBILE COMMUNICATION CO., LTD., Guangdong (CN)

(72) Inventors: Xiaodong Sun, Chang'an Dongguan (CN); Peng Sun, Chang'an Dongguan (CN); Jingzhi Ma, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 24 days.

(21) Appl. No.: 16/960,537

(22) PCT Filed: Jan. 2, 2019

(86) PCT No.: PCT/CN2019/070077
§ 371 (c)(1),
(2) Date: Jul. 7, 2020

(87) PCT Pub. No.: WO2019/137274
PCT Pub. Date: Jul. 18, 2019

(65) Prior Publication Data
US 2021/0067295 A1   Mar. 4, 2021

(30) Foreign Application Priority Data
Jan. 9, 2018   (CN) .................. 201810019946.0

(51) Int. Cl.
*H04L 5/00* (2006.01)
*H04L 27/156* (2006.01)
*H04W 28/26* (2009.01)
*H04W 72/04* (2009.01)

(52) U.S. Cl.
CPC .......... *H04L 5/0051* (2013.01); *H04L 27/156* (2013.01); *H04W 28/26* (2013.01); *H04W 72/0446* (2013.01)

(58) Field of Classification Search
CPC ... H04W 72/14; H04W 4/40; H04W 72/1289; H04W 72/0413; H04W 52/0235;
(Continued)

(56) References Cited

U.S. PATENT DOCUMENTS

2015/0230211 A1   8/2015   You et al.
2016/0100395 A1   4/2016   Xu et al.
(Continued)

FOREIGN PATENT DOCUMENTS

CN   105812105 A   7/2016
CN   106559207 A   4/2017
(Continued)

OTHER PUBLICATIONS

Extended European Search Report issued in corresponding application No. 19738435.7, dated Feb. 3, 2021.
(Continued)

*Primary Examiner* — Iqbal Zaidi
(74) *Attorney, Agent, or Firm* — Maschoff Brennan

(57) ABSTRACT

A method for transmitting a demodulation reference signal and a network device are provided. The method includes: determining whether to configure a corresponding demodulation reference signal (DMRS) for a shared channel, according to a mapping type of the shared channel, the number of symbols transmitted on the shared channel, and the number of DMRS symbols; configuring a target number of DMRSs for the shared channel, when determining to configure the corresponding DMRS for the shared channel; and mapping the target number of DMRSs onto a target transmission resource for transmission.

20 Claims, 3 Drawing Sheets

(58) Field of Classification Search
CPC ..... H04W 76/27; H04W 76/15; H04W 72/10; H04W 72/0453; H04L 5/0048; H04L 1/1812; H04L 41/0896; H04B 7/0452
See application file for complete search history.

(56) References Cited

U.S. PATENT DOCUMENTS

| | | | |
|---|---|---|---|
| 2016/0227557 A1* | 8/2016 | Fanous | H04W 72/1215 |
| 2016/0242200 A1* | 8/2016 | Yan | H04W 72/1289 |
| 2017/0093538 A1 | 3/2017 | Yoon et al. | |
| 2017/0302491 A1 | 10/2017 | Yang et al. | |
| 2019/0081754 A1 | 3/2019 | Cheng et al. | |
| 2019/0182826 A1* | 6/2019 | Yerramalli | H04L 5/0094 |

FOREIGN PATENT DOCUMENTS

| | | |
|---|---|---|
| CN | 107370579 A | 11/2017 |
| WO | 2017/026975 A1 | 2/2017 |
| WO | 2017138794 A2 | 8/2017 |

OTHER PUBLICATIONS

"Specifiction # 38.214" 3GPP TS 38.214 V15.0.0 (Dec. 2017).
CN Office Action in Application No. 201810019946.0 dated Dec. 26, 2019.
"Design of DL/UL DMRS for data transmission" 3GPP TSG RAN WG1 Meeting #91, Nov. 27, 2017.
"Remaining details on DMRS design" 3GPP TSG RAN WG1 Meeting #91, Nov. 27, 2017.
Kroean Office Action dated Feb. 23, 2022 as received in application No. 10-2020-7021588.
"Physical Channels and Modulation" 3GPP TS 38.211, V1.3.0 (Dec. 2017). Technical Specification Group Radio Access Network.
Indian Office Action dated Oct. 9, 2021 as received in application No. 202027033339.
Japanese Office Action dated Oct. 8, 2021 as received in application No. 2020-53776.
"On DMRS design", 3GPP TSG RAN WG1 Meeting #90bis R1-1717946 Prague, Czech Republic, Oct. 9-13, 2017. LG Electronics.
"Remaining issues on DMRS design" 3GPP TSG RAN WG1 Meeting 91 R1-1720668 Reno, USA, Nov. 27-Dec. 1, 2017. Qualcomm Incorporated.
"Remaining details on DM-RS" 3GPP TSG RAN WG1 Meeting #91 R1-1720808 Reno, USA, Nov. 27-Dec. 1, 2017. NTT DOCOMO, Inc.
"Remaining issues on DMRS design" 3GPP TSG RAN WG1 Meeting 91 R1-1721432 Reno, USA, Nov. 27-Dec. 1, 2017. Qualcomm Incorporated.
"Final Issues for Rel-15 PDSCH/PUSCH's DM-RS" 3GPP TSG RAN WG1 Meeting 91 R1-1721641 Reno, USA, Nov. 27-Dec. 1, 2017. Qualcomm Incorporated.

* cited by examiner

METHOD FOR TRANSMITTING DEMODULATION REFERENCE SIGNAL AND NETWORK DEVICE

CROSS-REFERENCE TO RELATED APPLICATION

This application is the U.S. national phase of PCT Application No. PCT/CN2019/070077 filed on Jan. 2, 2019, which claims a priority to Chinese Patent Application No. 201810019946.0 filed on Jan. 9, 2018, both disclosures of which are incorporated in their entireties by reference herein.

TECHNICAL FIELD

The present disclosure relates to the technical field of communications, in particular to a method for transmitting a demodulation reference signal and a network device.

BACKGROUND

The 5$^{th}$ Generation (5G) mobile communication system supports enhanced Mobile Broadband (eMBB) services, Ultra-Reliable and Low Latency Communications (URLLC) services, or massive Machine Type Communications (mMTC) services. In order to meet requirements of different services on performance indicators such as latency and reliability, a network supports slot-based scheduling and non-slot-based scheduling. Correspondingly, a demodulation reference signal (DMRS) of uplink and downlink shared channels supports two mapping types: Type A and Type B. In addition, in order to adapt to different scenarios such as low frequency and high frequency, low speed and high speed, one DMRS of the uplink and downlink shared channels may be configured with 1 or 2 symbols.

For DMRS of Physical Uplink Shared Channel (PUSCH), if the mapping type A is used, a reference point is the zeroth one of symbols of a slot, and a starting position $l_0$ of the DMRS of the first PUSCH may be configured in the 2$^{nd}$ or 3$^{rd}$ symbol. When the mapping type A is used by the DMRS of the first PUSCH, possible positions are shown in FIG. 1. If the mapping type B is used, the reference point is the zeroth symbol of the slot, and a starting position $l_0$ of the DMRS of the first PUSCH is the zeroth symbol of the PUSCH. When the mapping type B is adopted by the DMRS of the first PUSCH, possible positions are shown in FIG. 2.

When a DMRS of the PUSCH occupies one symbol, the number of DMRSs other than the DMRS of the first PUSCH may be configured according to different scenarios, as shown in Table 1 below.

TABLE 1

| Symbol length of PUSCH | PUSCH DMRS positions | | | | | | | |
|---|---|---|---|---|---|---|---|---|
| | Mapping type A | | | | Mapping type B | | | |
| | 0 | 1 | 2 | 3 | 0 | 1 | 2 | 3 |
| ≤7 | $l_0$ | — | — | — | 0 | 0, 4 | — | — |
| 8 | $l_0$ | — | — | — | — | 0 | 0, 6 | 0, 3, 6 |
| 9 | $l_0$ | $l_0$, 7 | — | — | 0 | 0, 6 | 0, 3, 6 | — |
| 10 | $l_0$ | $l_0$, 9 | $l_0$, 6, 9 | — | 0 | 0, 8 | 0, 4, 8 | 0, 3, 6, 9 |
| 11 | $l_0$ | $l_0$, 9 | $l_0$, 6, 9 | — | 0 | 0, 8 | 0, 4, 8 | 0, 3, 6, 9 |
| 12 | $l_0$ | $l_0$, 9 | $l_0$, 6, 9 | $l_0$, 5, 8, 11 | 0 | 0, 10 | 0, 5, 10 | 0, 3, 6, 9 |
| 13 | $l_0$ | $l_0$, 11 | $l_0$, 7, 11 | $l_0$, 5, 8, 11 | 0 | 0, 10 | 0, 5, 10 | 0, 3, 6, 9 |
| 14 | $l_0$ | $l_0$, 11 | $l_0$, 7, 11 | $l_0$, 5, 8, 11 | — | — | — | — |

When a DMRS of the PUSCH occupies two symbols, the number of DMRSs other than the DMRS of the first PUSCH may be configured according to different scenarios, as shown in Table 2 below.

TABLE 2

| Symbol length of PUSCH | PUSCH DMRS positions | | | | | | | |
|---|---|---|---|---|---|---|---|---|
| | Mapping type A | | | | Mapping type B | | | |
| | 0 | 1 | 2 | 3 | 0 | 1 | 2 | 3 |
| ≤7 | $l_0$ | — | | | 0 | — | | |
| 8 | $l_0$ | — | | | 0 | 0, 5 | | |
| 9 | $l_0$ | — | | | 0 | 0, 5 | | |
| 10 | $l_0$ | $l_0$, 8 | | | 0 | 0, 7 | | |
| 11 | $l_0$ | $l_0$, 8 | | | 0 | 0, 7 | | |
| 12 | $l_0$ | $l_0$, 8 | | | 0 | 0, 9 | | |
| 13 | $l_0$ | $l_0$, 10 | | | 0 | | | |
| 14 | $l_0$ | $l_0$, 10 | | | — | — | | |

For DMRS of Physical Downlink Shared Channel (PDSCH), if the mapping type A is used, a reference point is the first symbol of a slot, and a starting position of DMRS of the first PDSCH may be configured in the 2$^{nd}$ or 3$^{rd}$ symbol. If the mapping type B is used, a reference point is the first symbol of the PDSCH, and a starting position of the DMRS of the first PDSCH is the first symbol of the PDSCH.

When a DMRS of the PDSCH occupies one symbol, the number of DMRSs other than the DMRS of the first PDSCH may be configured according to different scenarios, as shown in Table 3 below.

TABLE 3

| Symbol length of PDSCH | PDSCH DMRS positions | | | | | | | |
|---|---|---|---|---|---|---|---|---|
| | Mapping type A | | | | Mapping type B | | | |
| | 0 | 1 | 2 | 3 | 0 | 1 | 2 | 3 |
| ≤6 | $l_0$ | — | — | — | $l_0$ | | | |
| 7 | $l_0$ | — | — | — | $l_0$ | $l_0$, 4 | | |
| 8 | $l_0$ | — | — | — | $l_0$ | | | |
| 9 | $l_0$ | $l_0$, 7 | — | — | $l_0$ | | | |
| 10 | $l_0$ | $l_0$, 9 | $l_0$, 6, 9 | — | $l_0$ | | | |
| 11 | $l_0$ | $l_0$, 9 | $l_0$, 6, 9 | — | $l_0$ | | | |
| 12 | $l_0$ | $l_0$9 | $l_0$, 6, 9 | $l_0$, 5, 8, 11 | $l_0$ | | | |
| 13 | $l_0$ | $l_0$, 11 | $l_0$, 7, 11 | $l_0$, 5, 8, 11 | $l_0$ | | | |
| 14 | $l_0$ | $l_0$, 11 | $l_0$, 7, 11 | $l_0$, 5, 8, 11 | $l_0$ | | | |

When a DMRS of the PUSCH occupies two symbols, the number of DMRSs other than the DMRS of the first PDSCH may be configured according to different scenarios, as shown in Table 4 below.

TABLE 4

| Symbol length of PDSCH | PDSCH DMRS positions | | | | | |
|---|---|---|---|---|---|---|
| | Mapping type A | | | Mapping type B | | |
| | 0 | 1 | 2 | 0 | 1 | 2 |
| ≤8 | $l_0$ | — | | $l_0$ | | |
| 8 | $l_0$ | — | | $l_0$ | | |
| 9 | $l_0$ | — | | $l_0$ | | |
| 10 | $l_0$ | $l_0, 8$ | | $l_0$ | | |
| 11 | $l_0$ | $l_0, 8$ | | $l_0$ | | |
| 12 | $l_0$ | $l_0, 8$ | | $l_0$ | | |
| 13 | $l_0$ | $l_0, 10$ | | $l_0$ | | |
| 14 | $l_0$ | $l_0, 10$ | | $l_0$ | | |

For the mapping type B, in a case that the number of symbols for PDSCH transmission is 2, 4, or 7, when part of the PDSCH conflicts with reserved control field resources, the DMRS of the first PDSCH is located in the first symbol after the control field.

For positions of PUSCH DMRSs in the related art when the number of symbols for PUSCH transmission is less than 7, for example, the number of symbols for PUSCH transmission is 1, when the mapping type A is adopted, the DMRS of the PUSCH is mapped onto the second or third symbol, and the DMRS of the PUSCH is transmitted only after PUSCH transmission has been completed, which may reduce the demodulation performance of delay services and may even cause incorrect reception. Similarly, problems of PDSCH DMRS is similar to the above problems of the PUSCH DMRS, due to positions of the PDSCH DMRS in the related art when the number of symbols for PDSCH transmission is less than 7.

SUMMARY

In a first aspect, embodiments of the present disclosure provide a method for transmitting a demodulation reference signal, which is applied to a network device side and includes:

determining whether to configure a corresponding demodulation reference signal (DMRS) for a shared channel, according to a mapping type of the shared channel, the number of symbols transmitted on the shared channel, and the number of DMRS symbols;

configuring a target number of DMRSs for the shared channel, when determining to configure the corresponding DMRS for the shared channel; and mapping the target number of DMRSs onto a target transmission resource for transmission.

In a second aspect, embodiments of the present disclosure further provide a network device, including:

a determination module, configured to determine whether to configure a corresponding demodulation reference signal (DMRS) for a shared channel, according to a mapping type of the shared channel, the number of symbols transmitted on the shared channel, and the number of DMRS symbols;

a configuration module, configured to configure a target number of DMRSs for the shared channel, when determining to configure the corresponding DMRS for the shared channel; and a transmission module is configured to map the target number of DMRSs onto a target transmission resource for transmission.

In a third aspect, embodiments of the present disclosure provides a network device, which includes a processor, a memory, and a program that is stored on the memory and is executable on the processor. The processor is configured to, when executing the program, implement steps of the above-mentioned method for transmitting a demodulation reference signal.

In a fourth aspect, embodiments of the present disclosure provides a computer-readable storage medium, where a program is stored on the computer-readable storage medium, and the program is executed by a processor to implement steps of the above-mentioned method for transmitting a demodulation reference signal.

BRIEF DESCRIPTION OF THE DRAWINGS

In order to more clearly explain technical solutions of embodiments of the present disclosure, drawings required for the description of the embodiments of the present disclosure will be briefly described below. Obviously, the drawings in the following description are only some embodiments of the present disclosure, and for those of ordinary skill in the art, other drawings can be obtained based on these drawings without creative efforts.

DETAILED DESCRIPTION

Figure 1:
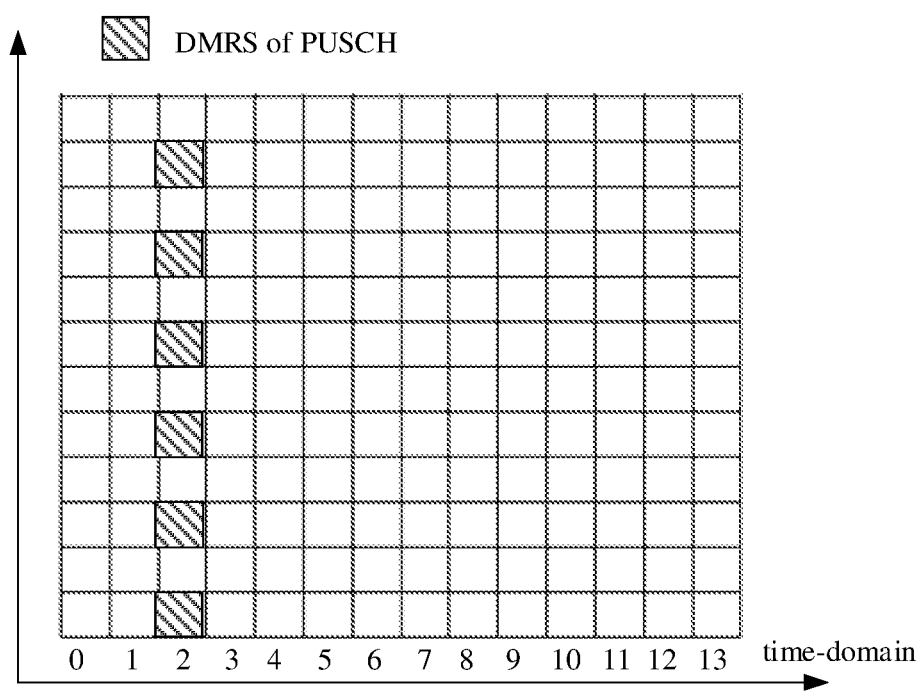
FIG. 1 shows a schematic diagram of resource mapping of DMRSs when a first mapping type is adopted by PUSCH in the related art.
Figure 2:
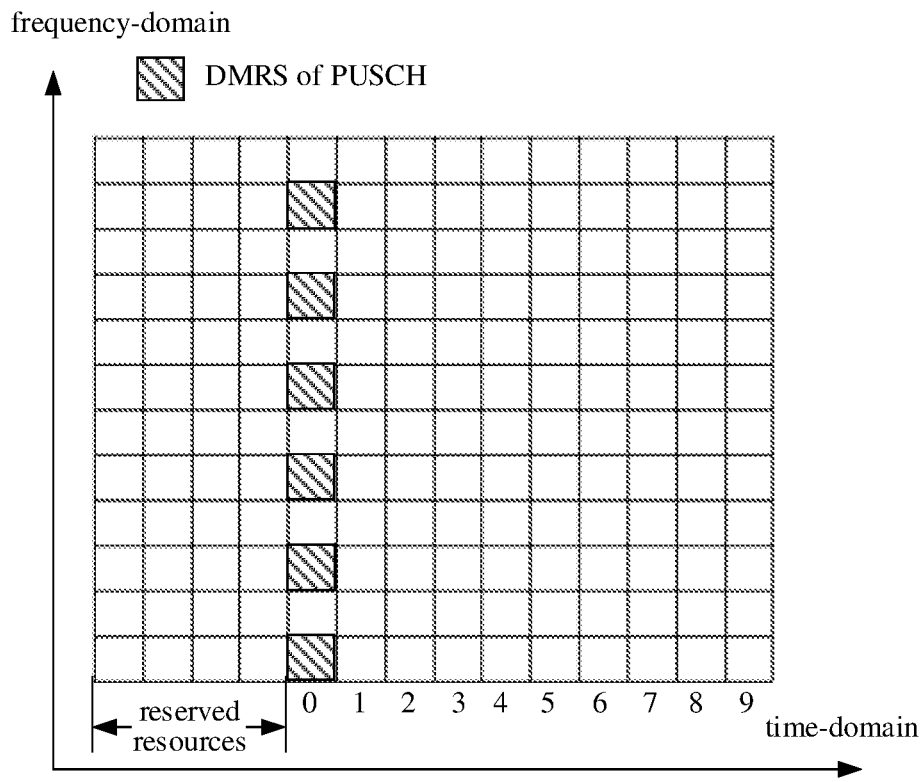
FIG. 2 shows a schematic diagram of resource mapping of DMRS when a second mapping type is adopted by PUSCH in the related art.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. Conversely, these embodiments are provided in order to enable a more thorough understanding of the present disclosure and to fully convey the scope of the present disclosure to those of ordinary skill in the art.

Such terms as "first", "second", and the like in the specification and claims of this application are used to distinguish similar objects without having to describe a particular order or sequence. It should be understood that the data used in this manner may be interchangeable where appropriate so that the embodiments of the present application described herein can be implemented, for example, in a sequence other than those illustrated or described herein. Furthermore, such terms as "including" and "having" and any variant thereof are intended to cover non-exclusive inclusion, for example, processes, methods, systems, products or devices that include a series of steps or units are not necessarily limited to those clearly listed, but may include other steps or units that are not clearly listed or inherent to these processes, methods, products or devices. In addition, the term "and/or" used in the specification and claims means at least one of objects linked by the term. For example, A, and/or B, and/or C means seven cases of: A alone, B alone, C alone, both A and B exist, both B and C exist, both A and C exist, and A, B, and C exist. Further, the sequences involved in the embodiments of the present disclosure all start from the zeroth.

Embodiments of the present disclosure provide a method for transmitting a demodulation reference signal and a network device, to solve problems of a poor demodulation performance of low-latency services caused by a DMRS transmission method in the related art.

Figure 3:
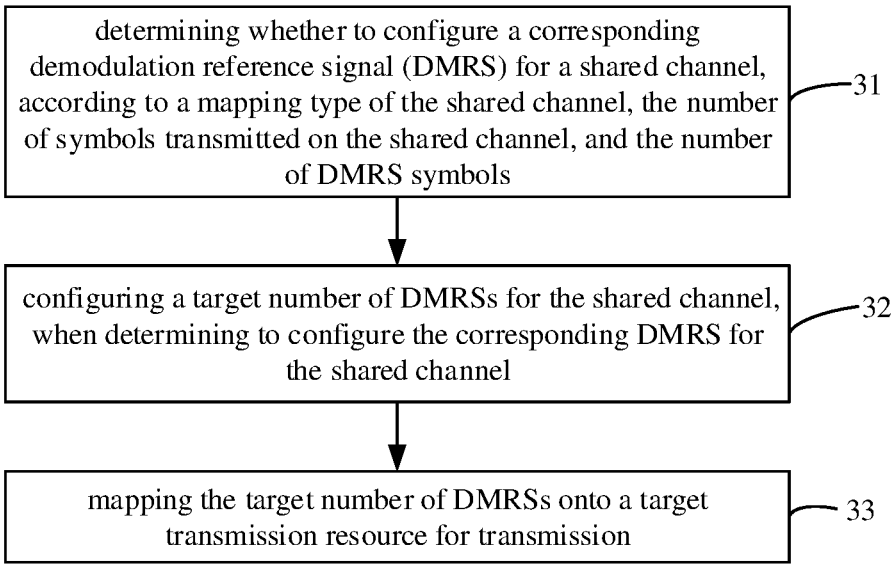
FIG. 3 is a schematic flowchart of a method for transmitting a demodulation reference signal according to embodiments of the present disclosure.

A method for transmitting a demodulation reference signal is provided according to embodiments of the present disclosure, which is applied to a network device side. As shown in FIG. 3, the method may include the following steps 31 to 33.

Step 31 includes: determining whether to configure a corresponding demodulation reference signal (DMRS) for a shared channel, according to a mapping type of the shared channel, the number of symbols transmitted on the shared channel, and the number of DMRS symbols.

The mapping type of the shared channel includes a first mapping type and a second mapping type. The first mapping type is mapping type A based on slot scheduling, that is, a time-domain transmission unit in the first mapping type is one slot, and one slot includes 14 symbols (which is also referred to as time-domain symbols or OFDM symbols). The second mapping type is mapping type B based on non-slot scheduling, that is, a time-domain transmission unit in the second mapping type is not a slot, and the number of symbols contained in one time-domain transmission unit is not equal to 14. Further, the number of symbols occupied by the time-domain transmission unit in the second mapping type is less than 14. The shared channel includes a physical uplink shared channel (PUSCH) or a physical downlink shared channel (PDSCH). The number of symbols transmitted on the shared channel is the size of time-domain transmission resources occupied by the shared channel, and the number of DMRS symbols refers to the size of time-domain transmission resources occupied by one DMRS.

Step 32 includes: configuring a target number of DMRSs for the shared channel, when determining to configure the corresponding DMRS for the shared channel.

Optionally, the target number is related to the mapping type of the shared channel and the number of symbols transmitted on the shared channel.

Step 33 includes: mapping the target number of DMRSs onto a target transmission resource for transmission.

It is worth noting that the transmission mentioned herein includes both uplink transmission and downlink transmission.

The method for transmitting a demodulation reference signal according to the embodiments of the present disclosure will be further described below in combination with different application scenarios.

In a case that the mapping type of the shared channel is the first mapping type (that is, the mapping type A) and the number of DMRS symbols is 1, step 31 may include at least one of the following manners.

When the number of symbols transmitted on the shared channel is a first value, and the first value is 1 or 2, it is determined that the corresponding DMRS is not configured for the shared channel Since a terminal does not expect a network side to configure the number of symbols transmitted on the shared channel to be 1 or 2, this scenario can be understood as the configuration where the number symbols for shared channel transmission is 1 or 2 does not exist.

When the number of symbols transmitted on the shared channel is a second value, and the second value is 3 or 4, if the number of symbols of total resources occupied by at least one of a control channel, a guard interval, or a reserved resource is greater than or equal to the second value, it is determined that the corresponding DMRS is not configured for the shared channel; and if not, it is determined to configure, for the shared channel, one DMRS that occupies one symbol. It is assumed that when the total number of symbols occupied by at least one of the control channel, resources, the guard interval (the guard interval is only applicable to the uplink), or the reserved resource is equal to 3, the terminal does not expect the network side to configure the number of symbols transmitted on the shared channel as 3. Therefore, this scenario may be understood as the configuration where the number of symbols transmitted on the shared channel is 3 does not exist. When the total number of symbols occupied by at least one of the control channel, the guard interval, or the reserved resource is less than 3, and the network device configures the number of symbols transmitted on the shared channel as 3, the network device may configure a DMRS of the shared channel on the second symbol of a slot where the shared channel is located. Alternatively, it is assumed that when the total number of symbols occupied by at least one of the control channel, the guard interval, or the reserved resource is equal to 4, the terminal does not expect the network side to configure the number of symbols transmitted on the shared channel to be 4, thus, this scenario may be understood as the configuration where the number of symbols transmitted on the shared channel is 4 does not exist. When the total number of symbols occupied by at least one of the control channel, the guard interval, or the reserved resource is less than 3, and the number of symbols transmitted on the shared channel configured by the network device is equal to 4, the network device may configure the DMRS of the shared channel on the second symbol or the third symbol of the slot where the shared channel is located. When the number of symbols occupied by the control channel, the guard interval, and the reserved resource is equal to 3, and the number of symbols transmitted on the shared channel configured by the network device is equal to 4, the network device may configure the DMRS of the shared channel on the third symbol of the slot where the shared channel is located.

When the number of symbols transmitted on the shared channel is a third value, it is determined that one DMRS that occupies one symbol is configured for the shared channel, and the third value is 5, 6, or 7.

In an embodiment, in a case that the mapping type of the shared channel is the first mapping type and the number of DMRS symbols is 2, step 31 may include at least one of the following:

determining not to configure the corresponding DMRS for the shared channel, when the number of symbols transmitted on the shared channel is a fourth value, where the fourth value is any value from 1 to 5; or determining to configure, for the shared channel, one DMRS that occupies two symbols, when the number of symbols transmitted on the shared channel is a fifth value, where the fifth value is 6 or 7.

Correspondingly, step 33 may include: mapping the one DMRS configured for the shared channel onto a second one or a third one of symbols of a slot where the shared channel is located, for transmission.

In another embodiment, in a case that the mapping type of the shared channel is the second mapping type, and the number of DMRS symbols is 1, step 31 may further include at least one of the following.

When the number of symbols transmitted on the shared channel is a sixth value, it is determined that one DMRS that occupies one symbol is configured for the shared channel, where the sixth value is any value from 1 to 5. That is, when the second mapping type is adopted by the DMRS of the shared channel, the maximum number of supported DMRS is 1. When the network device configures the number of symbols transmitted on the shared channel to be 1 or 2, the first DMRS of the shared channel is located at a starting symbol of the shared channel, and the first DMRS and the shared channel are transmitted in a frequency division multiplexing manner.

When the number of symbols transmitted on the shared channel is a seventh value, it is determined that one or two DMRSs are configured for the shared channel, where each DMRS of the one or two DMRSs occupies one symbol, and the seventh value is 6 or 7.

Optionally, in a case that the mapping type of the shared channel is the second mapping type, and the number of DMRS symbols is 2, step 31 may further includes at least one of the following:

determining not to configure the corresponding DMRS for the shared channel, when the number of symbols transmitted on the shared channel is an eighth value, where the eighth value is any value from 1 to 5; or determining to configure, for the shared channel, one DMRS that occupies two symbols, when the number of symbols transmitted on the shared channel is a ninth value, where the ninth value is 6 or 7.

Correspondingly, step 33 may include: mapping, when the target number is one, the one DMRS configured for the shared channel onto a zeroth one of symbols of a time-domain transmission unit where the shared channel is located, for transmission, where the number of symbols occupied by the time-domain transmission unit is less than the number of symbols occupied by one slot; and mapping, when the target number is two, a first DMRS of the two DMRSs configured for the shared channel onto the zeroth symbol of the time-domain transmission unit where the shared channel is located, for transmission, and mapping a second DMRS of the two DMRSs onto a fourth one of the symbols of the time-domain transmission unit where the shared channel is located, for transmission.

Optionally, step 33 may further include: mapping the target number of DMRSs onto a first symbol immediately after a control channel or a reserved resource, in a case that the target number is 1, and a resource occupied by the control channel or the reserved resource and a resource occupied by the shared channel are at least partially overlapped. It is assumed that when the network device configures the number of symbols transmitted on the shared channel to be 3 or 5, the network device defaults to configure the one DMRS of the shared channel on the starting symbol of the shared channel. When the control channel resource or the reserved resource overlaps a frequency-domain of the DMRS of the shared channel, all the DMRS of the shared channel is moved to the first symbol subsequent to the control channel resource or reserved resource.

Optionally, step 33 may further include: mapping a first DMRS of the two DMRSs configured for the shared channel onto a first target transmission resource for transmission, in a case that the target number is 2, and a resource occupied by a control channel or a reserved resource and a resource occupied by the shared channel are at least partially overlapped, where the first target transmission resource is a first symbol immediately after the control channel or the reserved resource; and mapping a second DMRS of the two DMRSs configured for the shared channel onto a second target transmission resource located after the first target transmission resource, if the second target resource is located after the resource occupied by the shared channel, discarding the second DMRS, and if not, transmitting the second DMRS on the second target transmission resource, where the second target transmission resource is the fourth symbol after the first target transmission resource. That is, when the control channel resource or the reserved resource overlaps with part of the frequency-domain of the DMRSs of the shared channel, all the DMRSs of the shared channel are moved to symbols subsequent to the control channel resource or the reserved resource, and the symbol occupied by the second DMRS and the symbol occupied by the first DMRS are spaced apart by 4 symbols. In this scenario, if the symbol occupied by the second DMRS exceed the number of symbols transmitted on the shared channel, the second DMRS is discarded.

Optionally, step 32 may further include: determining the target number of DMRSs configured for the shared channel, and configuring the corresponding DMRS for the shared channel, according to the mapping type of the shared channel, the number of symbols transmitted on the shared channel, the number of DMRS symbols, and the number of symbols of total resources occupied by at least one of a control channel, a guard interval, or a reserved resource. It is assumed that when the number of symbols transmitted on the shared channel is 6, and the number of DMRSs for the shared channel is 2, the terminal does not expect the network device to configure the total number of symbols occupied by at least one of the control channel, the guard interval, or the reserved resource to be greater than 1. When the number of symbols transmitted on the shared channel is 7, and the number of DMRSs for the shared channel is 2, the terminal does not expect the network device to configure the total number of symbols occupied by at least one of the control channel, the guard interval, or the reserved resource to be greater than 2.

In another embodiment, in a case that the shared channel is the PDSCH and a mapping type of the PDSCH is the second mapping type, step 31 may include at least one of the following:

determining to configure one or two DMRSs for the PDSCH, where each DMRS of the one or two DMRSs occupies one symbol, or determining to configure one DMRS that occupies two symbols for the PDSCH, when the number of symbols for PDSCH transmission is a tenth value, where the tenth value is 8, that is to say, when the network device configures the number of symbols for PDSCH transmission as 8, a PDSCH DMRS position configuration is the same as a PDSCH DMRS position configuration when the number of symbols for PDSCH transmission is 7, and the second mapping type is adopted; or determining to configure the DMRS for the PDSCH in accordance with DMRS configuration of a first mapping type, when the number of symbols for PDSCH transmission is an eleventh value, where the eleventh value is any value from 9 to 13, that is to say, when the network side configures the number of symbols for PDSCH transmission to any value of 9 to 13, a PDSCH DMRS position configuration is the same as a PDSCH DMRS position configuration when the number of symbols for PDSCH transmission is any value from 9 to 13, and the first mapping type is adopted.

Correspondingly, step 33 may include: mapping, when the target number is one, the one DMRS configured for the PDSCH onto a zeroth one of symbols of a time-domain transmission unit where the PDSCH is located, for transmission, where the number of symbols occupied by the time-domain transmission unit is less than the number of symbols occupied by one slot; or mapping, when the target number is two, a first DMRS of the two DMRSs configured for the PDSCH onto a zeroth one of symbols of a time-domain transmission unit where the PDSCH is located, for transmission, and mapping a second DMRS of the two DMRSs onto a fourth one of the symbols of the time-domain transmission unit where the PDSCH is located, for transmission.

In yet another embodiment, in a case that the shared channel is the PDSCH and a mapping type of the PDSCH is a second mapping type, step 31 may further include:

determining to configure one, two, or three DMRSs for the PDSCH, when the number of symbols for PDSCH transmission is a twelfth value, where each DMRS of the one, two, or three DMRSs occupies one symbol, and the twelfth value is any value of 8 to 11; or determining to configure one, two, three, or four DMRSs for the PDSCH, when the number of symbols for PDSCH transmission is a thirteenth value, where each DMRS of the one, two, three, or four DMRSs occupies one symbol, and the thirteenth value is 12 or 13.

In this scenario, step 33 may include: mapping, when the target number is one, the one DMRS configured for the PDSCH onto a zeroth one of symbols of a time-domain transmission unit where the PDSCH is located, for transmission, where the number of symbols occupied by the time-domain transmission unit is less than the number of symbols occupied by one slot; or mapping, when the target number is greater than or equal to 2, a first one of two DMRSs configured for the PDSCH onto a zeroth one of symbols of a time-domain transmission unit where the PDSCH is located, for transmission, mapping a last DMRS of the target number of DMRSs onto a penultimate one or a third-last one of the symbols of the time-domain transmission unit where the PDSCH is located, for transmission, and mapping other DMRSs of the target number of DMRSs onto symbols between the symbol of the first DMRS and the symbol of the last DMRS, for transmission, where the symbols are equally spaced apart from each other. Specifically, when the number of symbols for PDSCH transmission is 8, 10, or 12, the last DMRS in the target number of DMRSs is mapped onto the penultimate symbol of the time-domain transmission unit where the PDSCH is located for transmission. When the number of symbols for PDSCH transmission is 9, 11 or 13, the last DMRS in the target number of DMRSs is mapped onto the third-last symbol of the time-domain transmission unit where the PDSCH is located for transmission. It is assumed that the target number is 2, when the network device configures the number of symbols for PDSCH transmission to be 8 or 9, a position of the second DMRS is a symbol identified as symbol 6; when the network device configures the number of symbols for PDSCH transmission to be 10 or 11, a position of the second DMRS is a symbol identified as symbol 8; and when the network device configures the number of symbols for PDSCH transmission to be 12 or 13, a position of the second DMRS is a symbol identified as symbol 10. In a case that the target number is 3, the network device configures the number of symbols for PDSCH transmission to be 8 or 9, positions of the second and third DMRSs are symbols with symbol identifiers 3 and 6; when the network device configures the number of symbols for PDSCH transmission to be 10 or 11, positions of the second and third DMRSs are symbols with symbol identifiers 4 and 8; and when the number of symbols for PDSCH transmission configured by the network device is 12 or 13, positions of the second and third DMRSs are symbols with symbol identifiers 5 and 10.

In a case that the target number is 4, the network device configures the number of symbols for PDSCH transmission to be 12 or 13, and positions of the second, third, and fourth DMRSs are symbols with symbol identifiers 4, 7, and 10.

In another embodiment, in a case that the shared channel is the PDSCH and a mapping type of the PDSCH is a second mapping type, step 31 may further include: determining to configure one or two DMRSs for the PDSCH, when the number of symbols for PDSCH transmission is a fourteenth value, where each DMRS of the one or two DMRSs occupies two symbols, and the fourteenth value is any value from 8 to 13.

Correspondingly, step 33 may include: mapping, when the target number is one, the one DMRS configured for the PDSCH onto a zeroth one of symbols of a time-domain transmission unit where the PDSCH is located, for transmission, where the number of symbols occupied by the time-domain transmission unit is less than the number of symbols occupied by one slot; or mapping, when the target number is two, a first DMRS of the two DMRSs configured for the PDSCH onto a zeroth one of symbols of a time-domain transmission unit where the PDSCH is located, for transmission, and mapping a second DMRS of the two DMRSs onto a third-last symbol or a fourth-last one of the symbols of the time-domain transmission unit where the PDSCH is located for transmission. Specifically, when the number of symbols for PDSCH transmission is 8, 10, or 12, the last DMRS of the target number of DMRSs is mapped onto the third-last symbol of the time-domain transmission unit where the PDSCH is located for transmission; and when the number of symbols for PDSCH transmission is 9, 11, or 13, the last DMRS of the target number of DMRSs is mapped onto the fourth-last symbol of the time-domain transmission unit where the PDSCH is located for transmission. It is assumed that when the number of symbols for PDSCH transmission configured by the network device is 8 or 9, a position of the second DMRS is a symbol whose symbol identifier is 5. When the number of symbols for PDSCH transmission configured by the network device is 10 or 11, a position of the second DMRS is a symbol whose symbol identifier is 7. When the number of symbols for PDSCH transmission configured by the network device is 12 or 13, a position of the second DMRS is a symbol whose symbol identifier is 9.

It is worth noting that the first mapping type in the embodiments of the present disclosure refers to slot-based scheduling, and the mapping the DMRS onto the second or third symbol of the slot where the shared channel is located means: mapping the DMRS onto a symbol identified as 2 or 3 of the slot where the shared channel is located. The starting symbol of the slot is a reference symbol, which is identified as the zeroth symbol of the slot. The second mapping type refers to non-slot-based scheduling, and the mapping the DMRS onto the zeroth symbol of the time-domain transmission unit where the shared channel is located means: mapping the DMRS onto a symbol identified as 0 of the time-domain transmission unit where the shared channel is located, which may be also understood as the starting symbol for the shared channel transmission. The starting symbol for the shared channel transmission is a reference symbol, which is identified as the zeroth symbol of the time-domain transmission unit.

Optionally, in the above different scenarios, step 33 may further include: mapping the target number of DMRSs respectively onto the target number of target transmission sub-resources; and discarding a DMRS corresponding to the target transmission sub-resource in at least part of the resource located after a resource occupied by the shared channel. The DMRS mentioned herein may include one symbol or two symbols. Taking the DMRS with two symbols as an example, if some or all of resources of a certain DMRS configured by the network device for the shared channel are located after the resources occupied by the shared channel, the entire DMRS is discarded.

The method for transmitting a demodulation reference signal will be further described in the following embodiment in combination with specific application scenarios.

First Scenario:

The number of symbols for PDSCH transmission is less than or equal to 7. In the first scenario, when different mapping types are used by the shared channel, the network device configures different numbers of DMRSs for the shared channel, and schedules different target transmission resources for the DMRSs.

Example 1: taking a DMRS occupying one symbol as an example, resource mapping of DMRSs of a shared channel is shown in Table 5 below:

TABLE 5

| The number of symbols transmitted on shared channel | The number and positions of DMRSs of shared channel | | | | | | | |
|---|---|---|---|---|---|---|---|---|
| | First mapping type | | | | Second mapping type | | | |
| | 0 | 1 | 2 | 3 | 0 | 1 | 2 | 3 |
| 1 | — | — | — | — | 0 | — | — | — |
| 2 | — | — | — | — | 0 | — | — | — |
| 3 | $l_0$ | — | — | — | 0 | — | — | — |
| 4 | $l_0$ | — | — | — | 0 | — | — | — |
| 5 | $l_0$ | — | — | — | 0 | — | — | — |
| 6 | $l_0$ | — | — | — | 0 | 0, 4 | — | — |
| 7 | $l_0$ | — | — | — | 0 | 0, 4 | — | — |

The DMRSs of the shared channel are further described below in connection with Table 5.

Optionally, in a first aspect, in a case that the first mapping type is adopted by the shared channel, the first mapping type is also adopted by the corresponding DMRS configured by the network device for the shared channel, and the network device configures at most one DMRS for the shared channel.

When the number of symbols transmitted on the shared channel is 1, the network device does not configure DMRS for the shared channel with the number of transmission symbols of 1, as the terminal does not expect the network device to configure the number of symbols transmitted on the shared channel to be 1.

Similarly, when the number of symbols transmitted on the shared channel is 2, the network device does not configure DMRS for the shared channel with the number of transmission symbols of 2, as the terminal does not expect the network device to configure the number of symbols transmitted on the shared channel to be 2.

When the number of symbols transmitted on the shared channel is 3, it is necessary to further consider the total number of symbols occupied by at least one of a control channel, a guard interval (the guard interval is only applicable to the uplink), or a reserved resource. If the total number of symbols occupied by at least one of the control channel, the guard interval, or the reserved resource is greater than or equal to 3, the network device does not configure DMRS for the shared channel with the number of transmission symbols of 3, as the terminal does not expect the network device to configure the number of symbols transmitted on the shared channel to be 3. If the total number of symbols occupied by at least one of the control channel, the guard interval, or the reserved resource is smaller than 3, the network device configures one DMRS occupying one symbol for the shared channel with the number of transmission symbols of 3, and maps the one DMRS onto the second symbol of a slot where the shared channel is located, for transmission.

When the number of symbols transmitted on the shared channel is 4, it is necessary to further consider the total number of symbols occupied by at least one of a control channel, a guard interval or a reserved resource. If the total number of symbols occupied by at least one of the control channel, the guard interval, or the reserved resource is greater than or equal to 4, the network device does not configure DMRS for the shared channel with the number of transmission symbols of 4, as the terminal does not expect the network device to configure the number of symbols transmitted on the shared channel to be 4. If the total number of symbols occupied by at least one of the control channel, the guard interval, or the reserved resource is equal to 3, the network device configures one DMRS occupying one symbol for the shared channel with the number of transmission symbols of 4, and maps the one DMRS onto the third symbol of the slot where the shared channel is located, for transmission. If the total number of symbols occupied by at least one of the control channel, the guard interval, or the reserved resource is less than 3, the network device configures one DMRS occupying one symbol for the shared channel with the number of transmission symbols of 4, and maps the one DMRS onto the second symbol or the third symbol of the slot where the shared channel is located, for transmission.

When the number of symbols transmitted on the shared channel is 5, 6, or 7, the network device configures one DMRS occupying one symbol for the shared channel, and the DMRS is mapped onto the second symbol or the third symbol of the slot where the shared channel is located, for transmission.

Optionally, in a second aspect, in a case that the second mapping type is adopted by a shared channel, the second mapping type is also adopted by the corresponding DMRS configured by the network device for the shared channel.

When the number of symbols transmitted on the shared channel is 1, 2, 3, 4, or 5, the network device configures at most one DMRS with the number of symbols of 1, and the at most one DMRS is mapped onto the zeroth symbol of a time-domain transmission unit where the shared channel is located, for transmission, which can also be understood that the DMRS of the shared channel is located on the starting symbol of the shared channel, and the DMRS and the shared channel are frequency division multiplexed. Optionally, when the network device configures the number of symbols transmitted on the shared channel to be 3 or 5, the DMRS of the shared channel is located on the starting symbol of the shared channel by default. When a control channel resource or a reserved resource at least partially overlaps the resources occupied by the DMRSs of the shared channel, where the overlapping herein means overlapping in both time-domain and frequency-domain, all the DMRSs of the shared channel are moved to the first symbol after the control channel resource or the reserved resource, that is, mapping the DMRS of the shared channel onto the next symbol of the control channel resource or the reserved resource.

When the number of symbols transmitted on the shared channel is 6 or 7, the network device may configure the shared channel with one or two DMRSs, each of which occupies one symbol. When configuring one DMRS for the shared channel, the network device maps the one DMRS onto the zeroth symbol of the time-domain transmission unit where the shared channel is located for transmission, which can also be understood that the DMRS of the shared channel is located in the starting symbol of the shared channel, and the DMRS and the shared channel are frequency division multiplexed. When configuring two DMRSs for the shared channel, the network device maps a first DMRS of the two DMRSs configured for the shared channel onto the zeroth symbol of the time-domain transmission unit where the shared channel is located for transmission, and maps a second DMRS of the two DMRSs onto the fourth symbol of the time-domain transmission unit where the shared channel is located, for transmission. Optionally, when resources occupied by the control channel or the reserved resource overlap at least partially with the resources occupied by the DMRS of the shared channel, the first DMRS of the two DMRSs configured for the shared channel is mapped onto a first target transmission resource, for transmission, where the first target transmission resource is located in the first symbol after the control channel or the reserved resource; and the second DMRS of the two DMRSs is mapped onto a second target transmission resource after the first target transmission resource, for transmission, where the second target transmission resource is the fourth symbol after the first target transmission resource, that is, the symbol occupied by the first DMRS and the symbol occupied by the second DMRS are spaced apart by 4 symbols, for example: {0, 4}, {1, 5}, or {2, 6}.

Optionally, when the network device configures two DMRSs for the shared channel, the second DMRS may be discarded, after the symbol occupied by the second DMRS may exceed symbols occupied by the shared channel.

Optionally, when the number of symbols transmitted on the shared channel is 6, and the number of DMRS symbols is 2, the terminal does not expect that network device configures the total number of symbols occupied by at least one of the control channel, the guard interval, or the reserved resource to be greater than 1. When the number of symbols transmitted on the shared channel is 7, and the number of DMRS symbols is 2, the terminal does not expect that the network device configures the total number of symbols occupied by at least one of the control channel, the guard interval, or the reserved resource to be greater than 2.

Example 2: taking a DMRS occupying two symbols as an example, resource mapping of DMRSs of a shared channel is shown in Table 6 below:

TABLE 6

| The number of symbols for shared channel | The number and positions of DMRSs of shared channel | | | | | | | |
|---|---|---|---|---|---|---|---|---|
| | First mapping type | | | | Second mapping type | | | |
| | 0 | 1 | 2 | 3 | 0 | 1 | 2 | 3 |
| 1 | — | — | — | — | — | — | — | — |
| 2 | — | — | — | — | — | — | — | — |

TABLE 6-continued

| The number of symbols for shared channel | The number and positions of DMRSs of shared channel | | | | | | | |
|---|---|---|---|---|---|---|---|---|
| | First mapping type | | | | Second mapping type | | | |
| | 0 | 1 | 2 | 3 | 0 | 1 | 2 | 3 |
| 3 | — | — | — | — | — | — | — | — |
| 4 | — | — | — | — | — | — | — | — |
| 5 | — | — | — | — | — | — | — | — |
| 6 | $l_0$ | — | — | — | 0 | — | — | — |
| 7 | $l_0$ | — | — | — | 0 | — | — | — |

The DMRSs of the shared channel are further described below in conjunction with Table 6.

No matter whether a mapping type of the shared channel is the first mapping type or the second mapping type, the network device does not configure a DMRS with the number of DMRS symbols of 2 for the shared channel, when the shared channel transmits 1, 2, 3, 4, or 5 symbols.

When the shared channel transmits 6 or 7 symbols, the network device configures one DMRS occupying two symbols for the shared channel. When the first mapping type is adopted by the shared channel, the first mapping type is also adopted by the corresponding DMRS configured by the network device for the shared channel, the network device configures one DMRS occupying two symbols for the shared channel, and the starting position of the DMRS is mapped to the second symbol or the third symbol of the slot where the shared channel is located for transmission. When the second mapping type is adopted by the shared channel, the second mapping type is also adopted by the corresponding DMRS configured by the network device for the shared channel, the network device configures one DMRS occupying two symbols for the shared channel, and the starting position of the DMRS is mapped to the zeroth symbol of the slot where the shared channel is located for transmission, which may also be understood that the DMRS of the shared channel is located on the starting symbol of the shared channel Second Scenario:

The number of symbols for PDSCH transmission is less than or equal to 14. In the second scenario, when different mapping types are used by the shared channel, the network device configures a different number of DMRSs for the shared channel, and the target transmission resources scheduled for the DMRS are different. The number of symbols transmitted on the shared channel being less than or equal to 7 is introduced in the above first scenario, and the second scenario focuses on a scenario where the number of symbols transmitted on the shared channel is a value selected from 8 to 14. When the number of symbols transmitted on the shared channel is a value selected from 8 to 14, the PDSCH DMRS configuration method in the related art may be used if a mapping type of PDSCH is the first mapping type.

Example 3: this example corresponds to the example 1, and taking a DMRS occupying one symbol as an example, resource mapping of DMRSs of PDSCH is shown in Table 7 below:

TABLE 7

| The number of symbols for PDSCH transmission | The number and positions of DMRSs of PDSCH | | | | | | | |
|---|---|---|---|---|---|---|---|---|
| | First mapping type | | | | Second mapping type | | | |
| | 0 | 1 | 2 | 3 | 0 | 1 | 2 | 3 |
| 1 | — | — | — | — | 0 | — | — | — |
| 2 | — | — | — | — | 0 | — | — | — |

TABLE 7-continued

| The number of symbols for PDSCH transmission | The number and positions of DMRSs of PDSCH | | | | | | | |
|---|---|---|---|---|---|---|---|---|
| | First mapping type | | | | Second mapping type | | | |
| | 0 | 1 | 2 | 3 | 0 | 1 | 2 | 3 |
| 3 | $l_0$ | — | — | — | 0 | — | — | — |
| 4 | $l_0$ | — | — | — | 0 | — | — | — |
| 5 | $l_0$ | — | — | — | 0 | — | — | — |
| 6 | $l_0$ | — | — | — | 0 | 0, 4 | — | — |
| 7 | $l_0$ | — | — | — | 0 | 0, 4 | — | — |
| 8 | $l_0$ | — | — | — | 0 | 0, 4 | — | — |
| 9 | $l_0$ | $l_0$, 7 | — | — | 0 | 0, 7 | — | — |
| 10 | $l_0$ | $l_0$, 9 | $l_0$, 6, 9 | — | 0 | 0, 9 | 0, 6, 9 | — |
| 11 | $l_0$ | $l_0$, 9 | $l_0$, 6, 9 | — | 0 | 0, 9 | 0, 6, 9 | — |
| 12 | $l_0$ | $l_0$9 | $l_0$, 6, 9 | $l_0$, 5, 8, 11 | 0 | 0, 9 | 0, 6, 9 | 0, 5, 8, 11 |
| 13 | $l_0$ | $l_0$, 11 | $l_0$, 7, 11 | $l_0$, 5, 8, 11 | 0 | 0, 11 | 0, 7, 11 | 0, 5, 8, 11 |
| 14 | $l_0$ | $l_0$, 11 | $l_0$, 7, 11 | $l_0$, 5, 8, 11 | — | — | — | — |

The example 1 of the first scenario introduces the DMRS configuration and DMRS transmission manner when the number of symbols transmitted on the shared channel is a value selected from 1 to 7. The configuration and transmission of DMRS will be further described below in conjunction with Table 7, when the number of symbols for PDSCH transmission is a value selected from 8 to 14.

Optionally, in a first aspect, in a case that the first mapping type is adopted by PDSCH, the first mapping type is also adopted correspondingly by the DMRS configured by the network device for the shared channel, and the network device may configure DMRSs for PDSCH by existing technical standards.

When the number of symbols for PDSCH transmission is 8, the network device configures one DMRS occupying one symbol for the PDSCH, and the DMRS is mapped onto the second or third symbol of the slot where the PDSCH is located, for transmission.

When the number of symbols for PDSCH transmission is 9, the network device configures, for the PDSCH, one or two DMRSs, each DMRS of which occupies one symbol. When the network device configures one DMRS for the PDSCH, the one DMRS is mapped onto the second or third symbol of the slot where the PDSCH is located, for transmission. When the network device configures two DMRSs for PDSCH, the first DMRS of the two DMRSs is mapped onto the second or third symbol of the slot where the PDSCH is located, for transmission, and the second DMRS is mapped onto the seventh symbol of the slot where the PDSCH is located, for transmission.

When the number of symbols for PDSCH transmission is 10 or 11, the network device configures, for the PDSCH, one, two, or three DMRSs, and each DMRS of the one, two, or three DMRSs occupies one symbol. When the network device configures one DMRS for the PDSCH, the one DMRS is mapped onto the second or third symbol of the slot where the PDSCH is located, for transmission. When the network device configures two DMRSs for PDSCH, the first DMRS of the two DMRSs is mapped onto the second or third symbol of the slot where the PDSCH is located, for transmission, and the second DMRS of the two DMRSs is mapped onto the ninth symbol of the slot where the PDSCH is located, for transmission. When the network device configures three DMRSs for PDSCH, the first DMRS of the three DMRSs is mapped onto the second or third symbol of the slot where the PDSCH is located, for transmission, and the second DMRS of the three DMRSs is mapped onto the sixth symbol of the slot where the PDSCH is located, for transmission, and the third DMRS of the three DMRSs is mapped onto the ninth symbol of the slot where the PDSCH is located, for transmission.

When the number of symbols for PDSCH transmission is 12, the network device configures one, two, three, or four DMRSs for the PDSCH, and each DMRS of the one, two, three, or four DMRSs occupies one symbol. When the network device configures one DMRS for the PDSCH, the one DMRS is mapped onto the second or third symbol of the slot where the PDSCH is located for transmission. When the network device configures two DMRSs for PDSCH, the first DMRS of the two DMRSs is mapped onto the second or third symbol of the slot where the PDSCH is located for transmission, and the second DMRS of the two DMRSs is mapped onto the ninth symbol of the slot where the PDSCH is located, for transmission. When the network device configures three DMRSs for PDSCH, the first DMRS of the three DMRSs is mapped onto the second or third symbol of the slot where the PDSCH is located for transmission, and the second DMRS of the three DMRSs is mapped onto the sixth symbol of the slot where the PDSCH is located for transmission, and the third DMRS of the three DMRSs is mapped onto the ninth symbol of the slot where the PDSCH is located for transmission. When the network device configures four DMRSs for PDSCH, the first DMRS of the four DMRSs is mapped onto the second or third symbol of the slot where the PDSCH is located for transmission, the second DMRS of the four DMRSs is mapped onto the fifth symbol of the slot where the PDSCH is located for transmission, the third DMRS of the four DMRSs is mapped onto the eighth symbol of the slot where the PDSCH is located for transmission, and the fourth DMRS of the four DMRSs is mapped onto the eleventh symbol of the slot where the PDSCH is located for transmission.

When the number of symbols for PDSCH transmission is 13 or 14, the network device configures one, two, three, or four DMRSs for the PDSCH, and each DMRS of the one, two, three, or four DMRSs occupies one symbol. When the network device configures one DMRS for the PDSCH, the one DMRS is mapped onto the second or third symbol of the slot where the PDSCH is located for transmission. When the network device configures two DMRSs for PDSCH, the first DMRS of the two DMRSs is mapped onto the second or third symbol of the slot where the PDSCH is located for transmission, and the second DMRS of the two DMRSs is mapped onto the eleventh symbol of the slot where the PDSCH is located for transmission. When the network device configures three DMRSs for PDSCH, the first DMRS of the three DMRSs is mapped onto the second or third symbol of the slot where the PDSCH is located for transmission, the second DMRS of the three DMRSs is mapped onto the seventh symbol of the slot where the PDSCH is located for transmission, and the third DMRS of the three DMRSs is mapped onto the eleventh symbol of the PDSCH slot for transmission. When the network device configures four DMRSs for PDSCH, the first DMRS of the four DMRSs is mapped onto the second or third symbol of the slot where the PDSCH is located for transmission, the second DMRS of the four DMRSs is mapped onto the fifth symbol of the slot where the PDSCH is located for transmission, the third DMRS of the four DMRSs is mapped onto the eighth symbol of the slot where the PDSCH is located for transmission, and the fourth DMRS of the four DMRSs is mapped onto the eleventh symbol of the slot where the PDSCH is located for transmission.

Optionally, in a second aspect, in a case that the second mapping type is adopted by a PDSCH, the second mapping type is also adopted by the corresponding DMRS configured by the network device for the PDSCH. Since the second mapping type is a mapping type of non-slot-based scheduling, the maximum transmission symbol for the PDSCH is 13, and the configuration method of the first mapping type may be adopted by the network device to configure DMRSs for PDSCH.

When the number of symbols for PDSCH transmission is 8, the network device configures one or two DMRSs for the PDSCH, and each of the one or two DMRSs occupies one symbol. When the network device configures one DMRS for the PDSCH, the one DMRS is mapped onto the zeroth symbol of the time-domain transmission unit where the PDSCH is located, for transmission, which may also be understood that the DMRS of the PDSCH is located on the starting symbol of the PDSCH, and the DMRS and the PDSCH are frequency division multiplexed. When the network device configures two DMRSs for the PDSCH, the first DMRS of the two DMRSs is mapped onto the zeroth symbol of the time-domain transmission unit where the PDSCH is located for transmission, and the second DMRS of the two DMRSs is mapped onto the fourth symbol of the time-domain transmission unit where the PDSCH is located for transmission.

When the number of symbols for PDSCH transmission is 9, the network device configures one or two DMRSs for the PDSCH, and each of the one or two DMRSs occupies one symbol. When the network device configures one DMRS for the PDSCH, the one DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS of the two DMRSs is mapped onto the seventh symbol of the time-domain transmission unit where the PDSCH is located for transmission.

When the number of symbols for PDSCH transmission is 10 or 11, the network device configures one, two, or three DMRSs for the PDSCH, and each DMRS of the one, two, or three DMRSs occupies one symbol. When the network device configures one DMRS for the PDSCH, the one DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS is mapped onto the ninth symbol of the time-domain transmission unit where the PDSCH is located for transmission. When the network device configures three DMRSs for the PDSCH, the first DMRS of the three DMRSs is mapped onto the zeroth symbol of the time-domain transmission unit where the PDSCH is located for transmission, the second DMRS is mapped onto the sixth symbol of the time-domain transmission unit where the PDSCH is located for transmission, and the third DMRS is mapped onto the ninth symbol of the time-domain transmission unit where the PDSCH is located for transmission.

When the number of symbols for PDSCH transmission is 12, the network device configures one, two, three, or four DMRSs for the PDSCH, where each DMRS of the one, two, three, or four DMRSs occupies one symbol. When the network device configures one DMRS for the PDSCH, the one DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS of the two DMRSs is mapped onto the ninth symbol of the time-domain transmission unit where the PDSCH is located. When the network device configures three DMRSs for the PDSCH, the first DMRS of the three DMRSs is mapped onto the zeroth symbol of the time-domain transmission unit where the PDSCH is located for transmission, the second DMRS of the three DMRSs is mapped onto the sixth symbol of the time-domain transmission unit where the PDSCH is located for transmission, and the third DMRS of the three DMRSs is mapped onto the ninth symbol of the time-domain transmission unit where the PDSCH is located for transmission. When the network device configures four DMRSs for the PDSCH, the first DMRS of the four DMRSs is mapped onto the zeroth symbol of the time-domain transmission unit where the PDSCH is located for transmission, the second DMRS of the four DMRSs is mapped onto the fifth time-domain transmission unit where the PDSCH is located for transmission, the third DMRS of the four DMRSs is mapped onto the eighth symbol of the time-domain transmission unit where the PDSCH is located for transmission, and the fourth DMRS of the four DMRSs is mapped onto the eleventh symbol of the time-domain transmission unit where the PDSCH is located for transmission.

When the number of symbols for PDSCH transmission is 13 or 14, the network device configures one, two, three, or four DMRSs for the PDSCH, where each DMRS of the one, two, three, or four DMRSs occupies one symbol. When the network device configures one DMRS for the PDSCH, the one DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS is mapped onto the eleventh symbol of the time-domain transmission unit where the PDSCH is located for transmission. When the network device configures three DMRSs for the PDSCH, the first DMRS of the three DMRSs is mapped onto the zeroth symbol of the time-domain transmission unit where the PDSCH is located for transmission, the second DMRS is mapped onto the seventh symbol of the time-domain transmission unit where the PDSCH is located for transmission, and the third DMRS is mapped onto the eleventh symbol of the time-domain transmission unit where the PDSCH is located for transmission. When the network device configures four DMRSs for the PDSCH, the first DMRS of the four DMRSs is mapped onto the zeroth symbol of the time-domain transmission unit where the PDSCH is located for transmission, the second DMRS is mapped onto the fifth symbol of the time-domain transmission unit where the PDSCH is located for transmission, the third DMRS is mapped onto the eighth symbol of the time-domain transmission unit where the PDSCH is located for transmission, and the fourth DMRS is mapped onto the eleventh symbol of the time-domain transmission unit where the PDSCH is located for transmission.

Example 4: this example corresponds to the example 2, and taking a DMRS occupying two symbols as an example, resource mapping of DMRSs of PDSCH is shown in Table 8 below:

TABLE 8

| The number of symbols for PDSCH transmission | The number and positions of DMRSs of PDSCH | | | | | |
|---|---|---|---|---|---|---|
| | First mapping type | | | Second mapping type | | |
| | 0 | 1 | 2 | 0 | 1 | 2 |
| 1 | — | — | — | — | — | — |
| 2 | — | — | — | — | — | — |
| 3 | — | — | — | — | — | — |
| 4 | — | — | — | — | — | — |
| 5 | — | — | — | — | — | — |
| 6 | $l_0$ | — | — | 0 | — | — |
| 7 | $l_0$ | — | — | 0 | — | — |
| 8 | $l_0$ | — | — | 0 | — | — |
| 9 | $l_0$ | — | — | 0 | — | — |
| 10 | $l_0$ | $l_0, 8$ | — | 0 | 0, 8 | — |
| 11 | $l_0$ | $l_0, 8$ | — | 0 | 0, 8 | — |
| 12 | $l_0$ | $l_0, 8$ | — | 0 | 0, 8 | — |
| 13 | $l_0$ | $l_0, 10$ | — | 0 | 0, 10 | — |
| 14 | $l_0$ | $l_0, 10$ | — | — | — | — |

The example 2 of the first scenario introduces the configuration and transmission method of DMRS when the number of transmission symbols for the shared channel is a value selected from 1 to 7. The configuration and transmission of DMRS will be further described below in conjunction with Table 8, when the number of symbols for PDSCH transmission is a value selected from 8 to 14.

Optionally, in a first aspect, in a case that the first mapping type is adopted by PDSCH, the first mapping type is also adopted correspondingly by the DMRS configured by the network device for the shared channel, and the network device may configure DMRSs for PDSCH by using existing technical standards.

When the number of symbols for PDSCH transmission is 8 or 9, the network device configures one DMRS occupying two symbols for the PDSCH, and the DMRS is mapped onto the second or third symbol of the slot where the PDSCH is located for transmission.

When the number of symbols for PDSCH transmission is 10, 11, or 12, the network device configures one or two DMRSs for PDSCH, and each of the one or two DMRSs occupies two symbols. When the network device configures one DMRS for the PDSCH, the DMRS is mapped onto the second or third symbol of the slot where the PDSCH is located for transmission. When the network device configures two DMRSs for PDSCH, the first DMRS of the two DMRSs is mapped onto the second or third symbol of the slot where the PDSCH is located for transmission, and the second DMRS is mapped onto the eighth symbol of the slot where the PDSCH is located for transmission.

When the number of symbols for PDSCH transmission is 13 or 14, the network device configures one or two DMRSs for PDSCH, and each of the one or two DMRSs occupies two symbols. When the network device configures one DMRS for the PDSCH, the DMRS is mapped onto the second or third symbol of the slot where the PDSCH is located for transmission. When the network device configures two DMRSs for PDSCH, the first DMRS of the two DMRSs is mapped onto the second or third symbol of the slot where the PDSCH is located for transmission, and the second DMRS is mapped onto the tenth symbol of the slot where the PDSCH is located for transmission.

Optionally, in a second aspect, in a case that the second mapping type is adopted by a PDSCH, the second mapping type is also adopted by the corresponding DMRS configured by the network device for the PDSCH. Since the second mapping type is a mapping type of non-slot-based scheduling, the maximum transmission symbol for the PDSCH is 13, and part of the configuration method of the first mapping type may be adopted by the network device to configure DMRSs for PDSCH.

When the number of symbols for PDSCH transmission is 8 or 9, the network device does not configure a DMRS occupying two symbols for the PDSCH.

When the number of symbols for PDSCH transmission is 10, 11, or 12, the network device configures one or two DMRSs for PDSCH, where each of the one or two DMRSs occupies two symbols. When the network device configures one DMRS for the PDSCH, the one DMRS is mapped onto the zeroth symbol of the time-domain transmission unit where the PDSCH is located for transmission, which may also be understood that the DMRS of the PDSCH is located on the starting symbol of the PDSCH, and the DMRS and the PDSCH are frequency division multiplexed. When the network device configures two DMRSs for the PDSCH, the first DMRS of the two DMRSs is mapped onto the zeroth symbol of the time-domain transmission unit where the PDSCH is located for transmission, and the second DMRS is mapped onto the eighth symbol of the time-domain transmission unit where the PDSCH is located for transmission.

When the number of symbols for PDSCH transmission is 13, the network device configures one or two DMRSs for the PDSCH, where each of the one or two DMRSs occupies two symbols. When the network device configures one DMRS for the PDSCH, the one DMRS is mapped onto the zeroth symbol of the time-domain transmission unit where the PDSCH is located for transmission, which may also be understood that the DMRS of the PDSCH is located on the starting symbol of the PDSCH, and the DMRS and the PDSCH are frequency division multiplexed. When the network device configures two DMRSs for the PDSCH, the first DMRS of the two DMRSs is mapped onto the zeroth symbol of the time-domain transmission unit where the PDSCH is located for transmission, and the second DMRS is mapped onto the tenth symbol of the time-domain transmission unit where the PDSCH is located for transmission.

Third Scenario:

The number of symbols transmitted on the shared channel is less than or equal to 14. In the third scenario, when different mapping types are used by the shared channel, the network device configures different numbers of DMRSs for the shared channel, and target transmission resources scheduled for the DMRSs are different. The above first scenario introduces that the number of symbols transmitted on the shared channel is less than or equal to 7, and the third scenario and the second scenario are coordinating scenarios, and the third scenario focuses on a scenario where the number of symbols for PDSCH transmission is 8 to 14.

Example 5: this example corresponds to the example 1, taking a DMRS occupying one symbol as an example, resource mapping of DMRSs of a shared channel is shown in Table 9 below:

TABLE 9

| The number of symbols for PDSCH transmission | The number and positions of DMRSs of shared channel | | | | | | | |
|---|---|---|---|---|---|---|---|---|
| | First mapping type | | | | Second mapping type | | | |
| | 0 | 1 | 2 | 3 | 0 | 1 | 2 | 3 |
| 1 | — | — | — | — | 0 | — | — | — |
| 2 | — | — | — | — | 0 | — | — | — |
| 3 | $l_0$ | — | — | — | 0 | — | — | — |
| 4 | $l_0$ | — | — | — | 0 | — | — | — |
| 5 | $l_0$ | — | — | — | 0 | — | — | — |
| 6 | $l_0$ | — | — | — | 0 | 0, 4 | — | — |
| 7 | $l_0$ | — | — | — | 0 | 0, 4 | — | — |
| 8 | $l_0$ | — | — | — | 0 | 0, 6 | 0, 3, 6 | — |
| 9 | $l_0$ | $l_0$, 7 | — | — | 0 | 0, 6 | 0, 3, 6 | — |
| 10 | $l_0$ | $l_0$, 9 | $l_0$, 6, 9 | — | 0 | 0, 8 | 0, 4, 8 | — |
| 11 | $l_0$ | $l_0$, 9 | $l_0$, 6, 9 | — | 0 | 0, 8 | 0, 4, 8 | — |
| 12 | $l_0$ | $l_0$ 9 | $l_0$, 6, 9 | $l_0$, 5, 8, 11 | 0 | 0, 10 | 0, 5, 10 | 0, 4, 7, 10 |
| 13 | $l_0$ | $l_0$, 11 | $l_0$, 7, 11 | $l_0$, 5, 8, 11 | 0 | 0, 10 | 0, 5, 10 | 0, 4, 7, 10 |
| 14 | $l_0$ | $l_0$, 11 | $l_0$, 7, 11 | $l_0$, 5, 8, 11 | — | — | — | — |

The example 1 of the first scenario introduces the DMRS configuration and DMRS transmission manner when the number of symbols transmitted on the shared channel is a value selected from 1 to 7. The configuration and transmission of DMRS will be further described below in conjunction with Table 9, when the number of symbols for PDSCH transmission is a value selected from 8 to 14.

Optionally, in a first aspect, in a case that the first mapping type is adopted by PDSCH, the first mapping type is also adopted correspondingly by the DMRS configured by the network device for the shared channel, and the network device may configure DMRSs for PDSCH by existing technical standards. The specific mapping manner is as described in the example 3 of the second scenario, which is not repeated herein.

Optionally, in a second aspect, in a case that the second mapping type is adopted by a PDSCH, the second mapping type is also adopted by the corresponding DMRS configured by the network device for the PDSCH. Since the second mapping type is a mapping type of scheduling not based on a slot, the maximum transmission symbol for the PDSCH is 13.

When the number of symbols for PDSCH transmission is 8 or 9, the network device configures one, two, or three DMRSs for the PDSCH, and each DMRS of the one, two, or three DMRSs occupies one symbol. When the network device configures one DMRS for the PDSCH, the DMRS is mapped onto the zeroth symbol of the time-domain transmission unit where the PDSCH is located for transmission, which may also be understood that the DMRS of the PDSCH is located on the starting symbol of the PDSCH, and the DMRS and the PDSCH are frequency division multiplexed. When the network device configures two DMRSs for the PDSCH, the first DMRS of the two DMRSs is mapped onto the zeroth symbol of the time-domain transmission unit where the PDSCH is located for transmission, and the second DMRS is mapped onto the sixth symbol of the time-domain transmission unit where the PDSCH is located for transmission. When the network device configures three DMRSs for the PDSCH, the first DMRS of the three DMRSs is mapped onto the zeroth symbol of the time-domain transmission unit where the PDSCH is located for transmission, the second DMRS is mapped onto the third symbol of the time-domain transmission unit where the PDSCH is located for transmission, and the third DMRS is mapped onto the sixth symbol on the time-domain transmission unit where the PDSCH is located for transmission. A location of the last DMRS is determined according to the number of symbols for PDSCH transmission, and the last DMRS of the target number of DMRSs is mapped onto the second last symbol or the third last symbol of the time-domain transmission unit where the PDSCH is located for transmission. The DMRSs between the first DMRS and the last DMRS are distributed as evenly as possible between the symbol occupied by the first DMRS and the symbol occupied by the last DMRS.

When the number of symbols for PDSCH transmission is 10 or 11, the network device configures 1, 2, or 3 DMRSs for the PDSCH, where each of the 1, 2, or 3 DMRSs occupies one symbol. When the network device configures one DMRS for the PDSCH, the DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS is mapped onto the eighth symbol of the time-domain transmission unit where the PDSCH is located for transmission. When the network device configures three DMRSs for the PDSCH, the first DMRS of the three DMRSs is mapped onto the zeroth symbol of the time-domain transmission unit where the PDSCH is located for transmission, the second DMRS is mapped onto the fourth symbol of the time-domain transmission unit where the PDSCH is located for transmission, and the third DMRS is mapped onto the eighth symbol of the time-domain transmission unit where the PDSCH is located for transmission.

When the number of symbols for PDSCH transmission is 12 or 13, the network device configures 1, 2, 3, or 4 DMRSs for the PDSCH, where each DMRS of the 1, 2, 3, or 4 DMRSs occupies one symbol. When the network device configures one DMRS for the PDSCH, the DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS is mapped onto the tenth symbol of the time-domain transmission unit where the PDSCH is located for transmission. When the network device configures three DMRSs for the PDSCH, the first DMRS of the three DMRSs is mapped onto the zeroth symbol of the time-domain transmission unit where the PDSCH is located for transmission, the second DMRS is mapped onto the fifth symbol of the time-domain transmission unit where the PDSCH is located for transmission, and the third DMRS is mapped onto the tenth symbol in the time-domain transmission unit where the PDSCH is located for transmission. When the network device configures four DMRSs for the PDSCH, the first DMRS of the four DMRSs is mapped onto the zeroth symbol of the time-domain transmission unit where the PDSCH is located for transmission, the second DMRS is mapped onto the fourth symbol of the time-domain transmission unit where the PDSCH is located for transmission, the third DMRS is mapped onto the seventh symbol of the time-domain transmission unit where the PDSCH is located for transmission, and the fourth DMRS is mapped onto the tenth symbol of the time-domain transmission unit where the PDSCH is located for transmission.

Example 6: this example corresponds to the example 2, and taking a DMRS occupying two symbols as an example, resource mapping of DMRSs of PDSCH is shown in Table 10 below:

TABLE 10

| The number of symbols for PDSCH transmission | The number and positions of DMRSs of PDSCH | | | | | |
|---|---|---|---|---|---|---|
| | First mapping type | | | Second mapping type | | |
| | 0 | 1 | 2 | 0 | 1 | 2 |
| 1 | — | — | — | — | — | — |
| 2 | — | — | — | — | — | — |
| 3 | — | — | — | — | — | — |
| 4 | — | — | — | — | — | — |
| 5 | — | — | — | — | — | — |
| 6 | $l_0$ | — | — | 0 | — | — |
| 7 | $l_0$ | — | — | 0 | — | — |
| 8 | $l_0$ | — | — | 0 | 0, 5 | — |
| 9 | $l_0$ | — | — | 0 | 0, 5 | — |
| 10 | $l_0$ | $l_0$, 8 | — | 0 | 0, 7 | — |
| 11 | $l_0$ | $l_0$, 8 | — | 0 | 0, 7 | — |
| 12 | $l_0$ | $l_0$, 8 | — | 0 | 0, 9 | — |
| 13 | $l_0$ | $l_0$, 10 | — | 0 | 0, 9 | — |
| 14 | $l_0$ | $l_0$, 10 | — | — | — | — |

The example 2 of the first scenario introduces the DMRS configuration and DMRS transmission manner when the number of symbols transmitted on the shared channel is a value selected from 1 to 7. The configuration and transmission of DMRS will be further described below in conjunction with Table 10, when the number of symbols for PDSCH transmission is a value selected from 8 to 14.

Optionally, in the first aspect, in a case that the first mapping type is adopted by PDSCH, the first mapping type is also adopted correspondingly by the DMRS configured by the network device for the shared channel, and the network device may configure DMRSs for PDSCH by existing technical standards. The specific mapping manner is as described in the example 4 of the second scenario, which is not repeated herein.

Optionally, in a second aspect, in a case that the second mapping type is adopted by a PDSCH, the second mapping type is also adopted by the corresponding DMRS configured by the network device for the PDSCH. Since the second mapping type is a mapping type of scheduling not based on a slot, the maximum transmission symbol for the PDSCH is 13.

When the number of symbols for PDSCH transmission is 8 or 9, the network device configures one or two DMRSs for the PDSCH, and each DMRS of the one or two DMRSs occupies one symbol. When the network device configures one DMRS for the PDSCH, the DMRS is mapped onto the zeroth symbol of the time-domain transmission unit where the PDSCH is located for transmission. When the network device configures two DMRSs for the PDSCH, the first DMRS of the two DMRSs is mapped onto the zeroth symbol of the time-domain transmission unit where the PDSCH is located for transmission, and the second DMRS is mapped onto the fifth symbol of the time-domain transmission unit where the PDSCH is located for transmission.

When the number of symbols for PDSCH transmission is 10 or 11, the network device configures one or two DMRSs for the PDSCH, and each DMRS of the one or two DMRSs occupies two symbols. When the network device configures one DMRS for the PDSCH, the DMRS is mapped onto the zeroth symbol of the time-domain transmission unit where the PDSCH is located for transmission, which may also be understood that the DMRS of the PDSCH is located on the starting symbol of the PDSCH, and the DMRS and the PDSCH are frequency division multiplexed. When the network device configures two DMRSs for the PDSCH, the first DMRS of the two DMRSs is mapped onto the zeroth symbol of the time-domain transmission unit where the PDSCH is located for transmission, and the second DMRS is mapped onto the seventh symbol of the time-domain transmission unit where the PDSCH is located for transmission.

When the number of symbols for PDSCH transmission is 12 or 13, the network device configures one or two DMRSs for the PDSCH, and each DMRS of the one or two DMRSs occupies two symbols. When the network device configures one DMRS for the PDSCH, the DMRS is mapped onto the zeroth symbol of the time-domain transmission unit where the PDSCH is located for transmission, which may also be understood that the DMRS of the PDSCH is located on the starting symbol of the PDSCH, and the DMRS and the PDSCH are frequency division multiplexed. When the network device configures two DMRSs for the PDSCH, the first DMRS of the two DMRSs is mapped onto the zeroth symbol of the time-domain transmission unit where the PDSCH is located for transmission, and the second DMRS is mapped onto the ninth symbol of the time-domain transmission unit where the PDSCH is located for transmission.

In the method for transmitting a demodulation reference signal according to the embodiments of the present disclosure, a network device determines whether to configure a corresponding DMRS for a shared channel according to a mapping type of the shared channel and the number of symbols transmitted on the shared channel, and further configures a target number of DMRSs for the shared channel according to the mapping type of the shared channel and the number of symbols transmitted on the shared channel, when determining to configure the DMRS for the shared channel, so as to ensure the demodulation performance of the shared channel in various scenarios. Therefore, the correct transmission of the shared channel is ensured, and the correct transmission of service data is achieved.

Different scenarios of the method for transmitting a demodulation reference signal are respectively introduced in detail in the above embodiments. A network device corresponding to the method will be further described in the following embodiments in conjunction with the drawings.

Figure 4:
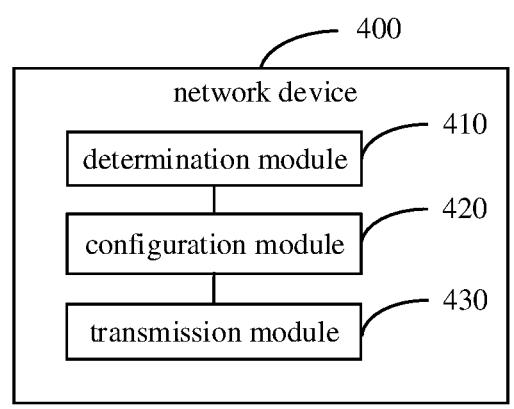
FIG. 4 shows a schematic diagram of a modular structure of a network device according to embodiments of the present disclosure.

As shown in FIG. 4, the network device 400 is provided according to embodiments of the present disclosure, which can implement details in the above embodiments about the method including: determining whether to configure a corresponding demodulation reference signal (DMRS) for a shared channel, according to a mapping type of the shared channel, the number of symbols transmitted on the shared channel, and the number of DMRS symbols; configuring a target number of DMRSs for the shared channel, when determining to configure the corresponding DMRS for the shared channel; and mapping the target number of DMRSs onto a target transmission resource for transmission. The same effects can be achieved. The network device 400 specifically includes the following functional modules:

a determination module 410, configured to determine whether to configure a corresponding DMRS for a shared channel, according to a mapping type of the shared channel, the number of symbols transmitted on the shared channel, and the number of DMRS symbols;

a configuration module 420, configured to configure a target number of DMRSs for the shared channel, when determining to configure the corresponding DMRS for the shared channel; and a transmission module 430, configured to map the target number of DMRSs onto a target transmission resource for transmission.

In a case that the mapping type of the shared channel is a first mapping type and the number of DMRS symbols is 1, the determination module 410 includes at least one of:

a first determination submodule, configured to determine not to configure the corresponding DMRS for the shared channel, when the number of symbols transmitted on the shared channel is a first value, where the first value is 1 or 2;

a second determination submodule, configured to: when the number of symbols transmitted on the shared channel is a second value, if the number of symbols of total resources occupied by at least one of a control channel, a guard interval, or a reserved resource is greater than or equal to the second value, determine not to configure the corresponding DMRS for the shared channel, and if not, determine to configure, for the shared channel, one DMRS that occupies one symbol, where the second value is 3 or 4; or a third determination submodule, configured to determine to configure, for the shared channel, one DMRS that occupies one symbol, when the number of symbols transmitted on the shared channel is a third value, where the third value is 5, 6, or 7.

In a case that the mapping type of the shared channel is a first mapping type and the number of DMRS symbols is 2, the determination module 410 further includes at least one of:

a fourth determination submodule, configured to determine not to configure the corresponding DMRS for the shared channel, when the number of symbols transmitted on the shared channel is a fourth value, where the fourth value is any value from 1 to 5; or a fifth determination submodule, configured to determine to configure, for the shared channel, one DMRS that occupies two symbols, when the number of symbols transmitted on the shared channel is a fifth value, where the fifth value is 6 or 7.

The transmission module 430 includes: a first transmission submodule, configured to map the one DMRS configured for the shared channel onto a second one or a third one of symbols of a slot where the shared channel is located, for transmission.

In a case that the mapping type of the shared channel is a second mapping type and the number of DMRS symbols is 1, the determination module 410 further includes at least one of:

a sixth determination submodule, configured to determine, for the shared channel, one DMRS that occupies one symbol, when the number of symbols transmitted on the shared channel is a sixth value, where the sixth value is any value from 1 to 5; or a seventh determination submodule, configured to determine to configure, for the shared channel, one or two DMRSs, when the number of symbols transmitted on the shared channel is a seventh value, where each DMRS of the one or two DMRSs occupies one symbol, and the seventh value is 6 or 7.

In a case that the mapping type of the shared channel is a second mapping type and the number of DMRS symbols is 2, the determination module 410 further includes at least one of:

an eighth determination submodule, configured not to configure the corresponding DMRS for the shared channel, when the number of symbols transmitted on the shared channel is an eighth value, where the eighth value is any value from 1 to 5; or a ninth determination submodule, configured to determine to configure, for the shared channel, one DMRS that occupies two symbols, when the number of symbols transmitted on the shared channel is a ninth value, where the ninth value is 6 or 7.

The transmission module 430 further includes:

a second transmission submodule, configured to map, when the target number is one, the one DMRS configured for the shared channel onto a zeroth one of symbols of a time-domain transmission unit where the shared channel is located, for transmission, where the number of symbols occupied by the time-domain transmission unit is less than the number of symbols occupied by one slot; and a third transmission submodule, configured to map, when the target number is two, a first DMRS of the two DMRSs configured for the shared channel onto the zeroth symbol of the time-domain transmission unit where the shared channel is located, for transmission, and mapping a second DMRS of the two DMRSs configured for the shared channel onto a fourth one of the symbols of the time-domain transmission unit where the shared channel is located, for transmission.

The transmission module 430 further includes: a fourth transmission submodule, configured to map the target number of DMRSs onto a first symbol immediately after a control channel or a reserved resource, in a case that the target number is 1, and a resource occupied by the control channel or the reserved resource and a resource occupied by the shared channel are at least partially overlapped.

The transmission module 430 further includes:

a fifth transmission submodule, configured to map a first DMRS of the two DMRSs configured for the shared channel onto a first target transmission resource for transmission, in a case that the target number is 2, and a resource occupied by a control channel or a reserved resource and a resource occupied by the shared channel are at least partially overlapped, where the first target transmission resource is a first symbol immediately after the control channel or the reserved resource; and a sixth transmission submodule, configured to map a second DMRS of the two DMRSs configured for the shared channel onto a second target transmission resource located after the first target transmission resource, if the second target resource is located after the resource occupied by the shared channel, discarding the second DMRS, and if not, transmitting the second DMRS on the second target transmission resource, where the second target transmission resource is the fourth symbol after the first target transmission resource.

The shared channel includes: a physical uplink shared channel (PUSCH) or a physical downlink shared channel (PDSCH).

In a case that the shared channel is the PDSCH and a mapping type of the PDSCH is a second mapping type, the determination module 410 further includes at least one of:

a tenth determination submodule, configured to determine to configure one or two DMRSs for the PDSCH, where each DMRS of the one or two DMRSs occupies one symbol, or determine to configure one DMRS that occupies two symbols for the PDSCH, when the number of symbols for PDSCH transmission is a tenth value, where the tenth value is 8; or an eleventh determination submodule, configured to determine to configure the DMRS for the PDSCH in accordance with DMRS configuration of a first mapping type, when the number of symbols for PDSCH transmission is an eleventh value, where the eleventh value is any value from 9 to 13.

The transmission module 430 further includes at least one of:

a seventh transmission submodule, configured to map, when the target number is one, the one DMRS configured for the PDSCH onto a zeroth one of symbols of a time-domain transmission unit where the PDSCH is located, for transmission, where the number of symbols occupied by the time-domain transmission unit is less than the number of symbols occupied by one slot; or an eighth transmission submodule, configured to map, when the target number is two, a first DMRS of the two DMRSs configured for the PDSCH onto a zeroth one of symbols of a time-domain transmission unit where the PDSCH is located, for transmission, and map a second DMRS of the two DMRSs onto a fourth one of the symbols of the time-domain transmission unit where the PDSCH is located, for transmission.

In a case that the shared channel is the PDSCH and a mapping type of the PDSCH is a second mapping type, the determination module 410 further includes at least one of:

a twelfth determination submodule, configured to determine to configure one, two, or three DMRSs for the PDSCH, when the number of symbols for PDSCH transmission is a twelfth value, where each DMRS of the one, two, or three DMRSs occupies one symbol, and the twelfth value is any value of 8 to 11; or a thirteenth determination submodule, configured to determine to configure one, two, three, or four DMRSs for the PDSCH, when the number of symbols for PDSCH transmission is a thirteenth value, where each DMRS of the one, two, three, or four DMRSs occupies one symbol, and the thirteenth value is 12 or 13.

The transmission module 430 further includes at least one of:

a ninth transmission submodule, configured to map, when the target number is one, the one DMRS configured for the PDSCH onto a zeroth one of symbols of a time-domain transmission unit where the PDSCH is located, for transmission, where the number of symbols occupied by the time-domain transmission unit is less than the number of symbols occupied by one slot; or a tenth transmission submodule, configured to map, when the target number is greater than or equal to 2, a first one of two DMRSs configured for the PDSCH onto a zeroth one of symbols of a time-domain transmission unit where the PDSCH is located, for transmission, mapping a last one of the target number of DMRSs onto a penultimate one or a third-last one of the symbols of the time-domain transmission unit where the PDSCH is located, for transmission, and mapping DMRSs of the target number of DMRSs other than the first DMRS and the last DMRS onto symbols between the symbol of the first DMRS and the symbol of the last DMRS for transmission, where the symbols are equally spaced apart from each other.

The tenth transmission submodule includes at least one of:

a first transmission unit, configured to map the last one of the target number of DMRSs onto the penultimate one of the symbols of the time-domain transmission unit where the PDSCH is located for transmission, when the number of symbols for PDSCH transmission is 8, 10, or 12; or a second transmission unit, configured to map the last one of the target number of DMRSs onto the third-last one of the symbols of the time-domain transmission unit where the PDSCH is located for transmission, when the number of symbols for PDSCH transmission is 9, 11, or 13.

In a case that the shared channel is the PDSCH and a mapping type of the PDSCH is a second mapping type, the determination module 410 further includes: a fourteenth determination submodule, configured to determine to configure one or two DMRSs for the PDSCH, when the number of symbols for PDSCH transmission is a fourteenth value, where each DMRS of the one or two DMRSs occupies two symbols, and the fourteenth value is any value from 8 to 13.

The transmission module 430 further includes:

an eleventh transmission submodule, configured to map, when the target number is one, the one DMRS configured for the PDSCH onto a zeroth one of symbols of a time-domain transmission unit where the PDSCH is located, for transmission, where the number of symbols occupied by the time-domain transmission unit is less than the number of symbols occupied by one slot; or a twelfth transmission submodule, configured to map, when the target number is two, a first DMRS of the two DMRSs configured for the PDSCH onto a zeroth one of symbols of a time-domain transmission unit where the PDSCH is located, for transmission, and map a second DMRS of the two DMRSs onto a third-last symbol or a fourth-last one of the symbols of the time-domain transmission unit where the PDSCH is located, for transmission.

The twelfth transmission submodule further includes:

a third transmission unit, configured to map the second DMRS of the two DMRSs onto the third-last one of the symbols of the time-domain transmission unit where the PDSCH is located for transmission, when the number of symbols for PDSCH transmission is 8, 10, or 12; and a fourth transmission unit, configured to map the second DMRS of the two DMRSs onto the fourth-last one of the symbols of the time-domain transmission unit where the PDSCH is located for transmission, when the number of symbols for PDSCH transmission is 9, 11, or 13.

The transmission module 430 further includes:

a mapping submodule, configured to map the target number of DMRSs respectively onto a target number of target transmission sub-resources; and a discarding submodule, configured to discard a DMRS corresponding to the target transmission sub-resource in at least part of the resource located after a resource occupied by the shared channel.

The configuration module 420 includes:

a configuration submodule, configured to determine the target number of DMRSs configured for the shared channel, and configure the corresponding DMRS for the shared channel, according to the mapping type of the shared channel, the number of symbols transmitted on the shared channel, the number of DMRS symbols, and the number of symbols of total resources occupied by at least one of a control channel, a guard interval, or a reserved resource.

It is worth noting that the network device in the embodiments of the present disclosure determines whether to configure a corresponding DMRS for a shared channel according to a mapping type of the shared channel and the number of symbols transmitted on the shared channel, and further configures a target number of DMRSs for the shared channel according to the mapping type of the shared channel and the number of symbols transmitted on the shared channel, when determining to configure the DMRS for the shared channel, so as to ensure the demodulation performance of the shared channel in various scenarios. Therefore, the correct transmission of the shared channel is ensured and the correct transmission of service data is achieved.

It should be noted that division of the above modules should be understood as only a logical division, which may be integrated into a physical entity or physically separated from each other in practice. All these modules may be implemented in the form of software invoked by a processing element, or in the form of hardware; or some modules may be implemented in the form of software invoked by a processing element, while some other modules may be implemented in the form of hardware. For example, the determination module may be a separately arranged processing element, or may be integrated into a chip of the above devices, or may be stored in a memory of the above devices in the form of program code, where functions of the determination module are invoked and executed by a processing element of the above devices, and implementations of other modules are similar to these. In addition, all or part of these modules can be integrated together or implemented independently. The processing element described herein may be an integrated circuit with signal processing capability. During implementations, the above-mentioned steps or the above-mentioned modules may be completed by the integrated logic circuit in the form of hardware in the processing element or by instructions in the form of software.

For example, the above modules may be one or more integrated circuits configured to implement the above methods, such as one or more Application Specific Integrated Circuits (ASICs), one or more Digital Signal Processors (DSPs), or one or more Field Programmable Gate Arrays (FPGAs). For another example, when one of the above modules is implemented in the form of a processing element scheduling codes, the processing element may be a general purpose processor, such as a central processing unit (CPU) or another processor that can call program codes. For another example, these modules may be integrated together in the form of System-On-a-Chip (SOC).

In order to better achieve the forgoing objectives, embodiments of the present disclosure further provide a network device, which includes a processor, a memory, and a computer program stored on the memory and executable on the processor. When executing the computer program, the processor is configured to implement steps in the method for transmitting a demodulation reference signal as described above. Embodiments of the present disclosure further provide a computer-readable storage medium, a computer program is stored thereon, and the computer program is executed by a processor to implement steps in the method for transmitting a demodulation reference signal as described above.

Figure 5:
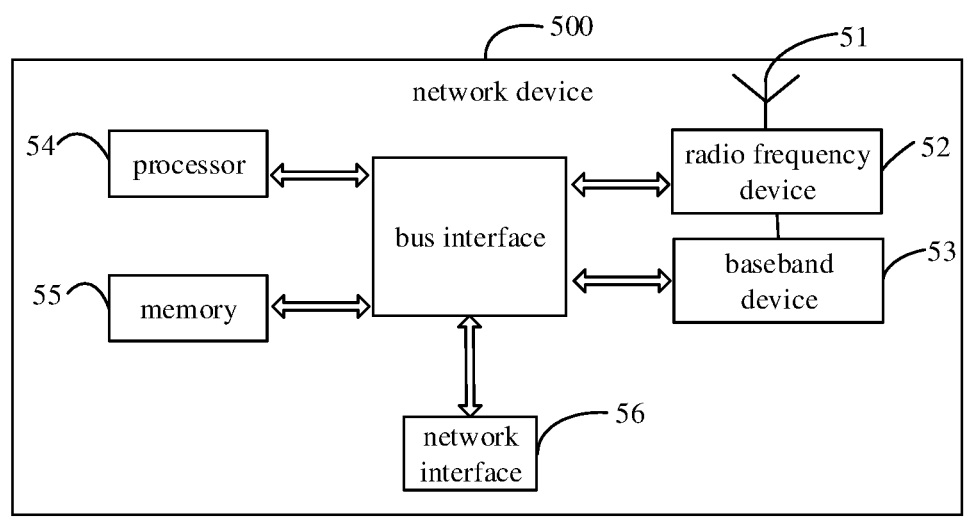
FIG. 5 shows a block diagram of a network device according to embodiments of the present disclosure.

Specifically, embodiments of the present disclosure further provide a network device. As shown in FIG. 5, the network device 500 includes an antenna 51, a radio frequency device 52, and a baseband device 53. The antenna 51 is connected to the radio frequency device 52. In an uplink direction, the radio frequency device 52 receives information by the antenna 51 and sends the received information to the baseband device 53 for processing. In a downlink direction, the baseband device 53 processes the information to be sent and sends it to the radio frequency device 52, and the radio frequency device 52 processes the received information and sends it out through the antenna 51.

The above-mentioned frequency band processing device may be located in the baseband device 53, and the method performed by the network device in the above embodiments may be implemented in the baseband device 53, which includes a processor 54 and a memory 55.

The baseband device 53 may include, for example, at least one baseband board, and a plurality of chips are provided on the baseband board, and as shown in FIG. 5, one of the chips is, for example, a processor 54 connected to the memory 55 to invoke programs in the memory 55 to preform operations of the network device in the above method embodiments.

The baseband device 53 may further include a network interface 56 for exchanging information with the radio frequency device 52, and the interface is, for example, a common public radio interface (CPRI for short).

The processor herein may be a processor or a general term for multiple processing elements. For example, the processor may be a CPU or an ASIC, or one or more integrated circuits configured to implement the method performed by the above network device, such as one or more microprocessors (DSPs), or one or more field programmable gate arrays (FPGAs). The storage element may be a memory or a general term for multiple storage elements.

The memory 55 may be a volatile memory or a non-volatile memory, or may include both of the volatile memory and the non-volatile memory. The non-volatile storage may be a read-only memory (ROM), a programmable ROM (PROM), an erasable PROM (EPROM), an electrically EPROM (EEPROM) or a flash memory. The volatile storage may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 55 described in the present application is meant to include, without limitation, these and any other suitable types of memories.

Specifically, the network device according to embodiments of the present disclosure further includes: a computer program stored on the memory 55 and executable on the processor 54. The computer program in the memory 55 is called by the processor 54 to perform methods executed by various modules shown in FIG. 4.

Specifically, the computer program is called by the processor 54 to: determine whether to configure a corresponding demodulation reference signal (DMRS) for a shared channel, according to a mapping type of the shared channel, the number of symbols transmitted on the shared channel, and the number of DMRS symbols; configure a target number of DMRSs for the shared channel, when determining to configure the corresponding DMRS for the shared channel; and map the target number of DMRSs onto a target transmission resource for transmission.

The network device may be a global system of mobile communication (GSM) or code division multiple access (CDMA) base transceiver station (BTS), or a wideband code division multiple access (WCDMA) NodeB (NB), or a LTE evolutional Node B (eNB or eNodeB), or a relay station or access point, or a future 5G network base station, etc., which is not limited herein.

According to the embodiments of the present disclosure, the network device determines whether to configure a corresponding DMRS for a shared channel according to a mapping type of the shared channel and the number of symbols transmitted on the shared channel, and further configures a target number of DMRSs for the shared channel according to the mapping type of the shared channel and the number of symbols transmitted on the shared channel, when determining to configure the DMRS for the shared channel, so as to ensure the demodulation performance of the shared channel in various scenarios. Therefore, the correct transmission of the shared channel is ensured and the correct transmission of service data is achieved.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for ease of description and conciseness, for a detailed working process of the foregoing system, device, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that may store program code, such as a universal serial bus (USB) flash drive, a mobile hard disk, an ROM, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, and using basic programing skills.

Therefore, the objective of the present disclosure may further be achieved by running a program or a group of programs on any computing device. The computing device may be a well-known and general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

Optional implementations of the present disclosure are described above. It should be noted that, numerous modifications and improvements may be made by a person of ordinary skill in the art without departing from the principle of the present disclosure, and these modifications and improvements shall fall also within the protection scope of the present disclosure.

What is claimed is:

1. A method for transmitting a demodulation reference signal, applied to a network device side, comprising:
   determining whether to configure a corresponding demodulation reference signal (DMRS) for a shared channel, according to a mapping type of the shared channel, the number of symbols transmitted on the shared channel, and the number of DMRS symbols;
   configuring a target number of DMRSs for the shared channel, when determining to configure the corresponding DMRS for the shared channel; and
   mapping the target number of DMRSs onto a target transmission resource for transmission,
   wherein the determining whether to configure the corresponding DMRS for the shared channel, according to the mapping type of the shared channel, the number of symbols transmitted on the shared channel, and the number of DMRS symbols comprises at least one of following steps:
   in a case that the mapping type of the shared channel is a first mapping type and the number of DMRS symbols is 1, determining not to configure the corresponding DMRS for the shared channel, when the number of symbols transmitted on the shared channel is a first value, wherein the first value is 1 or 2;
   in a case that the mapping type of the shared channel is a first mapping type and the number of DMRS symbols is 2, determining not to configure the corresponding DMRS for the shared channel, when the number of symbols transmitted on the shared channel is a fourth value, wherein the fourth value is any value from 1 to 5;
   in a case that the mapping type of the shared channel is a second mapping type and the number of DMRS symbols is 1, determining to configure, for the shared channel, one or two DMRSs, when the number of symbols transmitted on the shared channel is a seventh value, wherein each DMRS of the one or two DMRSs occupies one symbol, and the seventh value is 6 or 7;
   in a case that the mapping type of the shared channel is a second mapping type and the number of DMRS symbols is 2, determining to configure, for the shared channel, one DMRS that occupies two symbols, when the number of symbols transmitted on the shared channel is a ninth value, wherein the ninth value is 6 or 7.

2. The method for transmitting a demodulation reference signal according to claim 1, wherein in a case that the mapping type of the shared channel is a first mapping type and the number of DMRS symbols is 1, the determining whether to configure the corresponding DMRS for the shared channel, according to the mapping type of the shared channel, the number of symbols transmitted on the shared channel, and the number of DMRS symbols further comprises at least one of:
   when the number of symbols transmitted on the shared channel is a second value, if the number of symbols of total resources occupied by at least one of a control channel, a guard interval, or a reserved resource is greater than or equal to the second value, determining not to configure the corresponding DMRS for the shared channel, and if not, determining to configure, for the shared channel, one DMRS that occupies one symbol, wherein the second value is 3 or 4; or
   determining to configure, for the shared channel, one DMRS that occupies one symbol, when the number of symbols transmitted on the shared channel is a third value, wherein the third value is 5, 6, or 7.

3. The method for transmitting a demodulation reference signal according to claim 1, wherein in a case that the mapping type of the shared channel is a first mapping type and the number of DMRS symbols is 2, the determining whether to configure the corresponding DMRS for the shared channel, according to the mapping type of the shared channel, the number of symbols transmitted on the shared channel, and the number of DMRS symbols further comprises:
   determining to configure, for the shared channel, one DMRS that occupies two symbols, when the number of symbols transmitted on the shared channel is a fifth value, wherein the fifth value is 6 or 7.

4. The method for transmitting a demodulation reference signal according to claim 2, wherein the mapping the target number of DMRSs onto the target transmission resource for transmission comprises:
   mapping the one DMRS configured for the shared channel onto a second one or a third one of symbols of a slot where the shared channel is located, for transmission.

5. The method for transmitting a demodulation reference signal according to claim 1, wherein in a case that the mapping type of the shared channel is a second mapping type and the number of DMRS symbols is 1, the determining whether to configure the corresponding DMRS for the shared channel, according to the mapping type of the shared channel, the number of symbols transmitted on the shared channel, and the number of DMRS symbols further comprises:
   determining to configure, for the shared channel, one DMRS that occupies one symbol, when the number of symbols transmitted on the shared channel is a sixth value, wherein the sixth value is any value from 1 to 5.

6. The method for transmitting a demodulation reference signal according to claim 5, wherein the mapping the target number of DMRS s onto the target transmission resource for transmission comprises:
   mapping, when the target number is one, the one DMRS configured for the shared channel onto a zeroth one of symbols of a time-domain transmission unit where the shared channel is located, for transmission, wherein the number of symbols occupied by the time-domain transmission unit is less than the number of symbols occupied by one slot; and
   mapping, when the target number is two, a first DMRS of the two DMRSs configured for the shared channel onto the zeroth one of the symbols of the time-domain transmission unit where the shared channel is located, for transmission, and mapping a second DMRS of the two DMRSs onto a fourth one of the symbols of the time-domain transmission unit where the shared channel is located, for transmission.

7. The method for transmitting a demodulation reference signal according to claim 5, wherein the mapping the target number of DMRSs onto the target transmission resource for transmission comprises:

mapping the target number of DMRSs onto a first symbol immediately after a control channel or a reserved resource, in a case that the target number is 1, and a resource occupied by the control channel or the reserved resource at least partially overlaps a resource occupied by the shared channel; or mapping a first DMRS of the two DMRSs configured for the shared channel onto a first target transmission resource for transmission, in a case that the target number is 2, and a resource occupied by a control channel or a reserved resource at least partially overlaps a resource occupied by the shared channel, wherein the first target transmission resource is a first symbol immediately after the control channel or the reserved resource; and mapping a second DMRS of the two DMRS s onto a second target transmission resource located after the first target transmission resource, if the second target resource is located after the resource occupied by the shared channel, discarding the second DMRS, and if not, transmitting the second DMRS on the second target transmission resource, wherein the second target transmission resource is the fourth symbol after the first target transmission resource.

8. The method for transmitting a demodulation reference signal according to claim 1, wherein in a case that the mapping type of the shared channel is a second mapping type and the number of DMRS symbols is 2, the determining whether to configure the corresponding DMRS for the shared channel, according to the mapping type of the shared channel, the number of symbols transmitted on the shared channel, and the number of DMRS symbols further comprises:

determining not to configure the corresponding DMRS for the shared channel, when the number of symbols transmitted on the shared channel is an eighth value, wherein the eighth value is any value from 1 to 5.

9. The method for transmitting a demodulation reference signal according to claim 1, wherein the shared channel comprises: a physical uplink shared channel (PUSCH) or a physical downlink shared channel (PDSCH).

10. The method for transmitting a demodulation reference signal according to claim 9, wherein in a case that the shared channel is the PDSCH and a mapping type of the PDSCH is a second mapping type, the determining whether to configure the corresponding DMRS for the shared channel, according to the mapping type of the shared channel, the number of symbols transmitted on the shared channel, and the number of DMRS symbols comprises at least one of:

determining to configure one or two DMRSs for the PDSCH, wherein each DMRS of the one or two DMRSs occupies one symbol, or determining to configure one DMRS that occupies two symbols for the PDSCH, when the number of symbols for PDSCH transmission is a tenth value, wherein the tenth value is 8; or determining to configure the DMRS for the PDSCH in accordance with DMRS configuration of a first mapping type, when the number of symbols for PDSCH transmission is an eleventh value, wherein the eleventh value is any value from 9 to 13.

11. The method for transmitting a demodulation reference signal according to claim 10, wherein when the number of symbols for PDSCH transmission is the tenth value, the mapping the target number of DMRSs onto the target transmission resource for transmission comprises at least one of:

mapping, when the target number is one, the one DMRS configured for the PDSCH onto a zeroth one of symbols of a time-domain transmission unit where the PDSCH is located, for transmission, wherein the number of symbols occupied by the time-domain transmission unit is less than the number of symbols occupied by one slot; or mapping, when the target number is two, a first DMRS of the two DMRSs configured for the PDSCH onto a zeroth one of symbols of a time-domain transmission unit where the PDSCH is located, for transmission, and mapping a second DMRS of the two DMRSs onto a fourth one of the symbols of the time-domain transmission unit where the PDSCH is located, for transmission.

12. The method for transmitting a demodulation reference signal according to claim 9, wherein in a case that the shared channel is the PDSCH and a mapping type of the PDSCH is a second mapping type, the determining whether to configure the corresponding DMRS for the shared channel, according to the mapping type of the shared channel, the number of symbols transmitted on the shared channel, and the number of DMRS symbols comprises at least one of:

determining to configure one, two, or three DMRSs for the PDSCH, when the number of symbols for PDSCH transmission is a twelfth value, wherein each DMRS of the one, two, or three DMRSs occupies one symbol, and the twelfth value is any value of 8 to 11; or determining to configure one, two, three, or four DMRSs for the PDSCH, when the number of symbols for PDSCH transmission is a thirteenth value, wherein each DMRS of the one, two, three, or four DMRSs occupies one symbol, and the thirteenth value is 12 or 13.

13. The method for transmitting a demodulation reference signal according to claim 12, wherein the mapping the target number of DMRSs onto the target transmission resource for transmission comprises at least one of:

mapping, when the target number is one, the one DMRS configured for the PDSCH onto a zeroth one of symbols of a time-domain transmission unit where the PDSCH is located, for transmission, wherein the number of symbols occupied by the time-domain transmission unit is less than the number of symbols occupied by one slot; or mapping, when the target number is greater than or equal to 2, a first DMRS of the target number of DMRSs configured for the PDSCH onto a zeroth one of symbols of a time-domain transmission unit where the PDSCH is located, for transmission, mapping a last DMRS of the target number of DMRSs onto a penultimate one or a third-last one of the symbols of the time-domain transmission unit where the PDSCH is located, for transmission, and mapping other DMRS s of the target number of DMRS s onto symbols between the symbol of the first DMRS and the symbol of the last DMRS, for transmission, wherein the symbols are equally spaced apart from each other, and wherein the mapping the last DMRS of the target number of DMRSs onto the penultimate one or the third-last one of the symbols of the time-domain transmission unit where the PDSCH is located for transmission comprises at least one of:

mapping the last DMRS of the target number of DMRSs onto the penultimate one of the symbols of the time-domain transmission unit where the PDSCH is located for transmission, when the number of symbols for PDSCH transmission is 8, 10, or 12; or mapping the last DMRS of the target number of DMRSs onto the third-last one of the symbols of the time-domain transmission unit where the PDSCH is located for transmission, when the number of symbols for PDSCH transmission is 9, 11, or 13.

14. The method for transmitting a demodulation reference signal according to claim 9, wherein in a case that the shared channel is the PDSCH and a mapping type of the PDSCH is a second mapping type, the determining whether to configure the corresponding DMRS for the shared channel, according to the mapping type of the shared channel, the number of symbols transmitted on the shared channel, and the number of DMRS symbols comprises:

determining to configure one or two DMRSs for the PDSCH, when the number of symbols for PDSCH transmission is a fourteenth value, wherein each DMRS of the one or two DMRSs occupies two symbols, and the fourteenth value is any value from 8 to 13.

15. The method for transmitting a demodulation reference signal according to claim 14, wherein the mapping the target number of DMRSs onto the target transmission resource for transmission comprises at least one of:

mapping, when the target number is one, the one DMRS configured for the PDSCH onto a zeroth one of symbols of a time-domain transmission unit where the PDSCH is located, for transmission, wherein the number of symbols occupied by the time-domain transmission unit is less than the number of symbols occupied by one slot; or mapping, when the target number is two, a first DMRS of the two DMRSs configured for the PDSCH onto a zeroth one of symbols of a time-domain transmission unit where the PDSCH is located, for transmission, and mapping a second DMRS of the two DMRSs onto a third-last one or a fourth-last one of the symbols of the time-domain transmission unit where the PDSCH is located, for transmission, and wherein the mapping the second DMRS of the two DMRSs onto the third-last one or the fourth-last one of the symbols of the time-domain transmission unit where the PDSCH is located for transmission comprises at least one of:

mapping the second DMRS of the two DMRSs onto the third-last one of the symbols of the time-domain transmission unit where the PDSCH is located for transmission, when the number of symbols for PDSCH transmission is 8, 10, or 12; or mapping the second DMRS of the two DMRSs onto the fourth-last one of the symbols of the time-domain transmission unit where the PDSCH is located for transmission, when the number of symbols for PDSCH transmission is 9, 11, or 13.

16. The method for transmitting a demodulation reference signal according to claim 1, wherein the mapping the target number of DMRSs onto the target transmission resource for transmission comprises:

mapping the target number of DMRSs respectively onto the target number of target transmission sub-resources; and discarding a DMRS corresponding to the target transmission sub-resource in at least part of the resource located after a resource occupied by the shared channel.

17. The method for transmitting a demodulation reference signal according to claim 1, wherein the configuring the target number of the DMRS for the shared channel comprises:

determining the target number of DMRSs configured for the shared channel, and configuring the corresponding DMRS for the shared channel, according to the mapping type of the shared channel, the number of symbols transmitted on the shared channel, the number of DMRS symbols, and the number of symbols of total resources occupied by at least one of a control channel, a guard interval, or a reserved resource.

18. A network device, comprising: a processor, a memory, and a program that is stored on the memory and executable on the processor, wherein the processor is configured to execute the program to:

determine whether to configure a corresponding demodulation reference signal (DMRS) for a shared channel, according to a mapping type of the shared channel, the number of symbols transmitted on the shared channel, and the number of DMRS symbols;

configure a target number of DMRSs for the shared channel, when determining to configure the corresponding DMRS for the shared channel; and map the target number of DMRSs onto a target transmission resource for transmission, wherein in determining whether to configure the corresponding DMRS for the shared channel, according to the mapping type of the shared channel, the number of symbols transmitted on the shared channel, and the number of DMRS symbols, the processor is configured to perform at least one of following steps:

in a case that the mapping type of the shared channel is a first mapping type and the number of DMRS symbols is 1, determining not to configure the corresponding DMRS for the shared channel, when the number of symbols transmitted on the shared channel is a first value, wherein the first value is 1 or 2;

in a case that the mapping type of the shared channel is a first mapping type and the number of DMRS symbols is 2, determining not to configure the corresponding DMRS for the shared channel, when the number of symbols transmitted on the shared channel is a fourth value, wherein the fourth value is any value from 1 to 5;

in a case that the mapping type of the shared channel is a second mapping type and the number of DMRS symbols is 1, determining to configure, for the shared channel, one or two DMRSs, when the number of symbols transmitted on the shared channel is a seventh value, wherein each DMRS of the one or two DMRSs occupies one symbol, and the seventh value is 6 or 7;

in a case that the mapping type of the shared channel is a second mapping type and the number of DMRS symbols is 2, determining to configure, for the shared channel, one DMRS that occupies two symbols, when the number of symbols transmitted on the shared channel is a ninth value, wherein the ninth value is 6 or 7.

19. The network device according to claim 18, wherein in a case that the mapping type of the shared channel is a first mapping type and the number of DMRS symbols is 1, the processor is further configured to perform following steps:

when the number of symbols transmitted on the shared channel is a second value, if the number of symbols of total resources occupied by at least one of a control channel, a guard interval, or a reserved resource is greater than or equal to the second value, determining not to configure the corresponding DMRS for the shared channel, and if not, determining to configure, for the shared channel, one DMRS that occupies one symbol, wherein the second value is 3 or 4; or determining to configure, for the shared channel, one DMRS that occupies one symbol, when the number of symbols transmitted on the shared channel is a third value, wherein the third value is 5, 6, or 7, or, wherein in a case that the mapping type of the shared channel is a first mapping type and the number of DMRS symbols is 2, the processor is further configured to perform following steps:

determining to configure, for the shared channel, one DMRS that occupies two symbols, when the number of symbols transmitted on the shared channel is a fifth value, wherein the fifth value is 6 or 7, or, wherein in a case that the mapping type of the shared channel is a second mapping type and the number of DMRS symbols is 1, the processor is further configured to perform following steps:

determining to configure, for the shared channel, one DMRS that occupies one symbol, when the number of symbols transmitted on the shared channel is a sixth value, wherein the sixth value is any value from 1 to 5, or, in a case that the mapping type of the shared channel is a second mapping type and the number of DMRS symbols is 2, the processor is further configured to perform following steps:

determining not to configure the corresponding DMRS for the shared channel, when the number of symbols transmitted on the shared channel is an eighth value, wherein the eighth value is any value from 1 to 5.

20. A non-transitory computer-readable storage medium, wherein a program is stored on the computer-readable storage medium, and the program is executed by a processor to:

determine whether to configure a corresponding demodulation reference signal (DMRS) for a shared channel, according to a mapping type of the shared channel, the number of symbols transmitted on the shared channel, and the number of DMRS symbols;

configure a target number of DMRSs for the shared channel, when determining to configure the corresponding DMRS for the shared channel; and map the target number of DMRSs onto a target transmission resource for transmission, wherein the determining whether to configure the corresponding DMRS for the shared channel, according to the mapping type of the shared channel, the number of symbols transmitted on the shared channel, and the number of DMRS symbols comprises at least one of following steps:

in a case that the mapping type of the shared channel is a first mapping type and the number of DMRS symbols is 1, determining not to configure the corresponding DMRS for the shared channel, when the number of symbols transmitted on the shared channel is a first value, wherein the first value is 1 or 2;

in a case that the mapping type of the shared channel is a first mapping type and the number of DMRS symbols is 2, determining not to configure the corresponding DMRS for the shared channel, when the number of symbols transmitted on the shared channel is a fourth value, wherein the fourth value is any value from 1 to 5;

in a case that the mapping type of the shared channel is a second mapping type and the number of DMRS symbols is 1, determining to configure, for the shared channel, one or two DMRSs, when the number of symbols transmitted on the shared channel is a seventh value, wherein each DMRS of the one or two DMRSs occupies one symbol, and the seventh value is 6 or 7;

in a case that the mapping type of the shared channel is a second mapping type and the number of DMRS symbols is 2, determining to configure, for the shared channel, one DMRS that occupies two symbols, when the number of symbols transmitted on the shared channel is a ninth value, wherein the ninth value is 6 or 7.

* * * * *